United States Patent
Au et al.

(10) Patent No.: US 8,718,135 B2
(45) Date of Patent: May 6, 2014

(54) METHOD AND SYSTEM FOR TRANSCODING BASED ROBUST STREAMING OF COMPRESSED VIDEO

(75) Inventors: Oscar Chi Lim Au, Hong Kong (CN); Xiaopeng Fan, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 1187 days.

(21) Appl. No.: 12/555,591

(22) Filed: Sep. 8, 2009

(65) Prior Publication Data

US 2010/0074333 A1 Mar. 25, 2010

Related U.S. Application Data

(60) Provisional application No. 61/136,621, filed on Sep. 19, 2008.

(51) Int. Cl.
*H04N 11/04* (2006.01)
(52) U.S. Cl.
USPC ............ 375/240.12; 375/240.03; 375/240.24; 375/240.25; 348/27; 348/394.1
(58) Field of Classification Search
USPC ............ 375/240.03, 240.12, 240.24, 240.25; 348/27, 394.1
See application file for complete search history.

(56) References Cited

U.S. PATENT DOCUMENTS

| | | | |
|---|---|---|---|
| 6,339,450 B1 * | 1/2002 | Chang et al. | ................... 348/470 |
| 7,103,669 B2 | 9/2006 | Apostolopoulos | |
| 7,120,850 B2 | 10/2006 | Lehobey et al. | |
| 7,162,093 B2 | 1/2007 | Regunathan et al. | |
| 7,349,472 B2 | 3/2008 | Vetro et al. | |
| 2010/0226262 A1 * | 9/2010 | Liu et al. | ....................... 370/252 |

OTHER PUBLICATIONS

Zhou et al., Robust Streaming of Offline Coded H.264/AVC Video Via Alternative Macroblock Coding, Apr. 2008, IEEE Transactions on Circuits and Systems for Video Technology, vol. 18, No. 4, pp. 425-438.*
Fan et al., Transcoding Based Robust Streaming of Compresed Video, 2009, IEEE, pp. 909-912.*
de los Reyes et al., "Error-resilient transcoding for video over wireless channels," IEEE Journal on Selected Areas in Communications, 18: 6, 1063-1074 (Jun. 2000).
Dogan et al., "Error-resilient video transcoding for robust internetwork communications using GPRS," IEEE Transactions on Circuits and Systems for Video Technology, 12: 6, 453-464 (Jun. 2002).
Shu et al., "Intra/Inter Macroblock Mode Decision for Error-Resilient Transcoding," IEEE Transactions on Multimedia, 10: 1, 97-104 (Jan. 2008).

(Continued)

*Primary Examiner* — Ayaz Sheikh
*Assistant Examiner* — Nicholas Sloms
(74) *Attorney, Agent, or Firm* — Leydig, Voit & Mayer, Ltd.

(57) ABSTRACT

Described herein is a novel transcoding technique called lossless inter frame transcoding (LIFT) for improving the error resilience of video streaming. According to various embodiments, conventional coded blocks are selectively transcoded into new transcoded blocks. At the decoder, the transcoded blocks can be transcoded back to the conventional coded blocks when prediction is available and can also be robustly decoded independently when prediction is unavailable. According to another embodiment, an offline transcoding and online composing technique is provided for generating a composite frame using the transcoded and conventional coded blocks and adjusting the ratio of the transcoded blocks, thereby achieving error robustness scalability.

26 Claims, 13 Drawing Sheets

(56) References Cited

OTHER PUBLICATIONS

Vetro et al., "Error resilience video transcoding for wireless communications," IEEE Wireless Communications, 12: 4, 14-21 (Aug. 2005).

Cote et al., "Optimal intra coding of blocks for robust video communication over the Internet," *Signal Processing: Image Communication,* vol. 15, No. 1, pp. 25-34, Elsevier Science B.V. (1999).

Wang et al., "Multiple Description Coding for Video Delivery," *Proceedings of the IEEE,* vol. 93, No. 1, IEEE (Jan. 2005).

Wiegand et al., "Long-Term Memory Motion-Compensated Prediction," *Circuits and Systems for Video Technology, IEEE Transactions on,* vol. 9, No. 1, pp. 70-84, IEEE (1999).

Zhang et al., "Video Coding with Optimal Inter/Intra-Mode Switching for Packet Loss Resilience," *Selected Areas in Communications, IEEE Journal on,* vol. 18, No. 6, pp. 966-976, IEEE (Jun. 2000).

Zhu et al., "Error Resilient Video Coding Using Redundant Pictures," *Circuits and Systems for Video Technology, IEEE Transactions on,* vol. 19, No. 1, pp. 801-804, IEEE (Jan. 2009).

\* cited by examiner

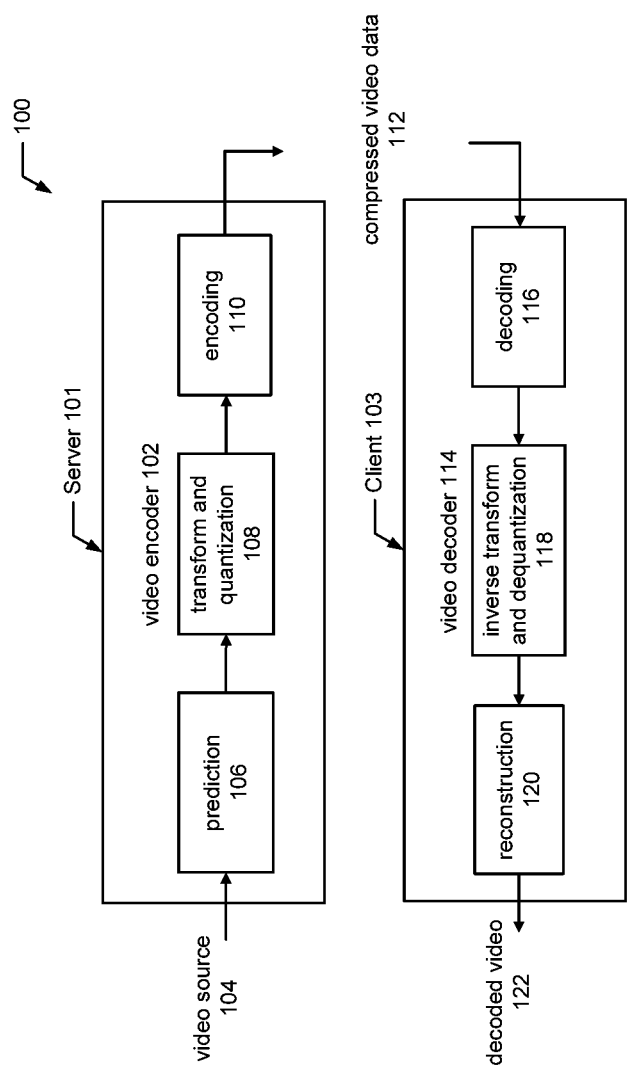

ial Patent Application No. 61/136,621, filed Sep. 19, 2008, which is hereby incorporated by reference in its entirety.

METHOD AND SYSTEM FOR TRANSCODING BASED ROBUST STREAMING OF COMPRESSED VIDEO

CROSS-REFERENCE TO RELATED APPLICATIONS

This patent application claims the benefit of U.S. Provisional Patent Application No. 61/136,621, filed Sep. 19, 2008, which is hereby incorporated by reference in its entirety.

TECHNICAL FIELD

The present invention relates to the field of video compression in general and to the transcoding-based video compression in particular.

NOTATIONS

The following notations are utilized in this application only to ease the discussions and descriptions of various exemplary embodiments of the invention. They, however, are not intended to limit the scope of the invention.

| | |
|---|---|
| x | original video data block |
| y | prediction block associated with x |
| $e = x - y$ | residual block associated with x |
| $X = T(x)$ | transform of x |
| $Y = T(y)$ | transform of y |
| $E = T(e)$ | transform of e |
| $Q(.)$ | quantization |
| $T(.)$ | transform |
| $E(.)$ | encoding |
| $Q(E)$ | quantization of E (or coefficient block) associated with the original video block x |
| $Q(Y)$ | quantization of Y |
| $Q^{-1}$ | rescaling (de-quanization) |
| $T^{-1}$ | inverse transform |
| $E^{-1}$ | decoding |
| $\hat{E}$ | reconstruction of E |
| $\hat{e}$ | reconstruction of residual block e |
| $\hat{x}:$ | reconstruction of original video data block x |

BACKGROUND OF THE INVENTION

Video coding involves representing video data, for storage and/or transmission, for both analog and digital video. The goals of video coding are to accurately represent the video data compactly, provide means for navigating the video (i.e., search forward, backward, random access, etc.) and provide other additional author and content benefits such as subtitles. One of the most difficult tasks in video coding is reducing the size of the video data using video compression. Video compression generally refers to the techniques for reducing the quantity of data used to represent digital video data, and is a combination of spatial image compression and temporal motion compensation.

The search for efficient video compression techniques has dominated much of the research activity concerning video coding since the early 1980s. The first major milestone was the H.261 standard, from which the Joint Photographic Experts Group (JPEG) adopted the idea of using the Discrete Cosine Transform (DCT). Since then, many other advancements have been made to compression techniques such as motion estimation. In particular, the International Telecommunications Union (ITU) have published a number of standards aimed at coding video data including H.261, H.262 and H.263. The International Organization for Standardization (ISO) and International Electrotechnical Commission (IEC) joined together to make the latest video coding standard, H.264/Advanced Video Coding (AVC), also known as MPEG-4 part 10. The H.264 standard is a successor to earlier standards such as MPEG-2 and MPEG-4. The standard protocols of H.261, H.262, H.263, H.264/AVC, MPEG-2, MPEG-4, AVS (including AVS-M, AVS1.0, and etc), and H.264/SVC are hereby incorporated by reference.

Due to the rapid growth of the Internet and the increasing demand for video content, video streaming services over communication networks have received tremendous attention from academia and industry. In a typical streaming system, the compressed video streams are transmitted from a server to client devices for real time decoding and displaying. To mitigate the packet loss or delay during transmissions, a variety of error resilience techniques have been proposed. Most previous error resilience techniques focus on improving the error robustness during online compression. In video streaming systems such as video on demand systems, however, the video server provides video services based on offline compressed video. Therefore, it is desired to improve the error resilience of transmitting previously compressed video for providing high-quality video services

BRIEF SUMMARY OF THE INVENTION

Described herein are various embodiments of an invention for providing error resilience transmissions of offline compressed video data. According the various embodiments of the invention, a lossless inter frame transcoding (LIFT) technique is described to convert a conventional coded video data block to a novel type of block called transcoded block to achieve error robustness similar to the intra-coded I-block. According to one embodiment, the transcoded block can be losslessly converted back to the exact original coded block when there is no transmission error. According to another embodiment, the transcoded block can be decoded robustly like an intra-coded I-block when the predicted block is not available due to transmission errors.

Unlike the conventional coded data block, the transcoded data block carries not only the coded coefficient associated with the video data block, but also the prediction data used for generating the coefficient data during the coding process. According to one embodiment of the invention, the transcoded data block incorporates a linear combination of the coefficient block and the prediction block associated with the original video data block. The linear combination of the coefficient block and the prediction block is preferably a summation of the quantized and transformed coefficient block and the quantized and transformed prediction block.

At the decoder side, when prediction block is available from the previously coded data block, the original video data can be losslessly recovered from the coded bit stream and the prediction data. When the prediction block is unavailable to the decoder due to packet loss, the original video data can still be robustly reconstructed from the coded bit stream. Because the summation of the quantized and transformed coefficient block and the quantized and transformed prediction block is an approximation of the original video data, the reconstruction generated as such is a lossy estimation of the original video data.

According to an alternative embodiment, the transcoded data block can be generated directly from the original video data. In addition, the transcoded data block can be converted back to the conventional coded data block which can then be decoded by conventional decoder.

Furthermore, a video server utilizing a novel offline transcoding and online composing technique is described in keeping another embodiment of the invention. According to this embodiment, the video server converts the conventional coded data block of a video stream to their corresponding transcoded data block by way of off line transcoding. When providing a video service using the coded data blocks, the video server selectively replacing one or more conventional coded data blocks in the video stream with their transcoded counterparts. Because the transcoded data block can be robustly decoded even when the their prediction blocks are unavailable to the decoder, the original video data can still be recovered from the coded video stream in high packet loss environments having time-varying channels, such as wireless channels, Wi-Fi/Wi-Max, 3G/3.5G/4G, Bluetooth, wired channels, interne, IP-network, etc. For a time-varying channel, this technique can achieve the same adaptive error robustness as online transcoding when the server cannot afford online transcoding. This technique is particularly suitable for a video streaming system where multiple clients having different channel status are connected to the server simultaneously.

According to one embodiment, a method is provided for transmitting digital video data having a plurality of data blocks. The method includes encoding a video data block to a coded data block, converting the coded data block to a transcoded data block incorporating a prediction block and a residual block associated with the video data block, and transmitting the transcoded data block to a decoder for decoding.

In keeping with this embodiment, encoding the video data block further comprises forming the prediction block associated with the video data block, calculating the residual block by subtracting the prediction block from the video data block, transforming the residual block, quantizing the transformed residual block, and forming the coded data block by encoding the quantized transformed residual block.

In addition, converting the coded data block to the transcoded data block further comprises decoding the coded data block into the quantized transformed residual block, forming the prediction block corresponding to the video data block, transforming and quantizing the prediction block, summing the quantized transformed residual and the quantized transformed prediction blocks, and generating the transcoded data block by encoding the summation.

In keeping with the above embodiment, a computer readable medium is provided, including program codes for instructing one or more digital processors for transmitting digital video data having a plurality of data blocks. The program codes include instructions for encoding a video data block to a coded data block, instructions for converting the coded data block to a transcoded data block incorporating a prediction block and a residual block associated with the video data block, and instructions for transmitting the transcoded data block to a decoder for decoding.

According to another embodiment of the invention, a method is described for providing a video service based on digital video data having a plurality of data blocks. The method includes encoding each of the plurality of data blocks to a coded data block, converting each of the plurality of coded data blocks to a transcoded data block incorporating a prediction block and a residual block associated with the coded data block, transmitting at least one of the plurality of coded data blocks and at least one of the plurality of transcoded data blocks in a bit stream transmitted over a computer network to a decoder, and adjusting a ratio of the transcoded data blocks in the bit stream.

In another embodiment, a computer readable medium is provided, including program codes stored thereon, which are executable by one of more digital processor in order to provide a video service based on digital video data having a plurality of data blocks. The computer codes include instructions for encoding each of the plurality of data blocks to a coded data block, instructions for converting each of the plurality of coded data blocks to a transcoded data block incorporating a prediction block and a residual block associated with the coded data block, instructions for transmitting at least one of the plurality of coded data blocks and at least one of the plurality of transcoded data blocks in a bit stream transmitted over a computer network to a decoder, and instructions for adjusting a ratio of the transcoded data blocks in the bit stream.

In still another embodiment, a method is provided for decoding video data including a plurality of blocks. The method includes receiving a bit stream carrying a block of encoded data encoded from a block of video data, obtaining the block of encoded data by decoding the bit stream, determining the block of encoded data to be a transcoded data block incorporating a prediction block and a residual block associated with the block of video data, determining an availability of the prediction block associated with the block of video data, and selecting according to the availability of the prediction data block one of a first and a second decoding schemes for decoding the transcoded data block.

In keeping with this embodiment, the first decoding scheme is a lossless decoding scheme. The method further comprises determining the prediction block to be available, and decoding the transcoded data block in accordance with the first decoding scheme. In a further embodiment, decoding the transcoded data block in accordance with the first decoding scheme includes obtaining the prediction block associated with the block of video data from previous reconstructed video data, transforming the prediction block, quantizing the transformed prediction block, subtracting the quantized transformed prediction block from the transcoded data block, de-quantizing the subtracted transcoded data block, reconstructing the residual block by inverse transforming the de-quantized subtracted transcoded data block, and forming an approximation of the block of video data by summing the prediction block and the reconstructed residual block, wherein the approximation is a lossless reconstruction of the block of video data.

In an alternative embodiment, the second decoding scheme is a lossy decoding scheme. Accordingly, the method further comprises determining the prediction block to be unavailable, and decoding the transcoded data block in accordance with the second decoding scheme. In a further embodiment, decoding the transcoded data block in accordance with the second decoding scheme comprises de-quantizing the transcoded data block, and forming an approximation of the block of video data by inverse transforming the de-quantized transcoded data block, wherein the approximation is a lossy reconstruction of the block of video data.

The transform, quantization, encoding and their inverse operations including inverse transform, de-quantizing, and decoding described above comply with a video coding standard selected from a group of H.261, H.262, H.263, H.264/AVC, MPEG-2, MPEG-4, AVS-M, AVS1.0, and H.264/SVC. In addition, these operations may also comply with any video coding techniques that utilize motion compensation for encoding the video data.

BRIEF DESCRIPTION OF THE SEVERAL VIEWS OF THE DRAWING(S)

FIG. 1A depicts a general diagram of a system for providing video services based on video encoding and decoding techniques;

Figure 11A:
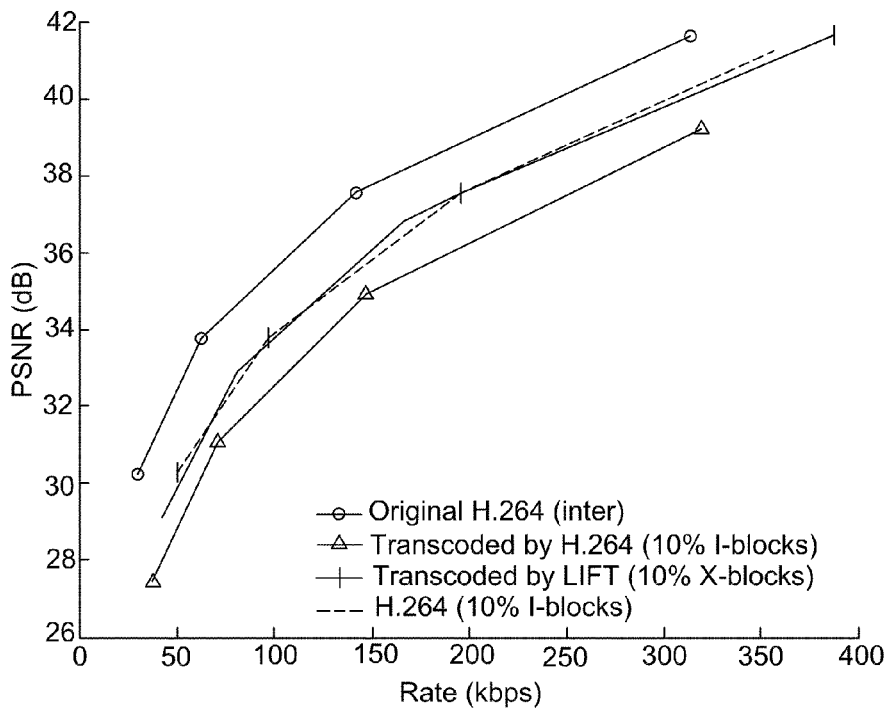
Figure 11B:
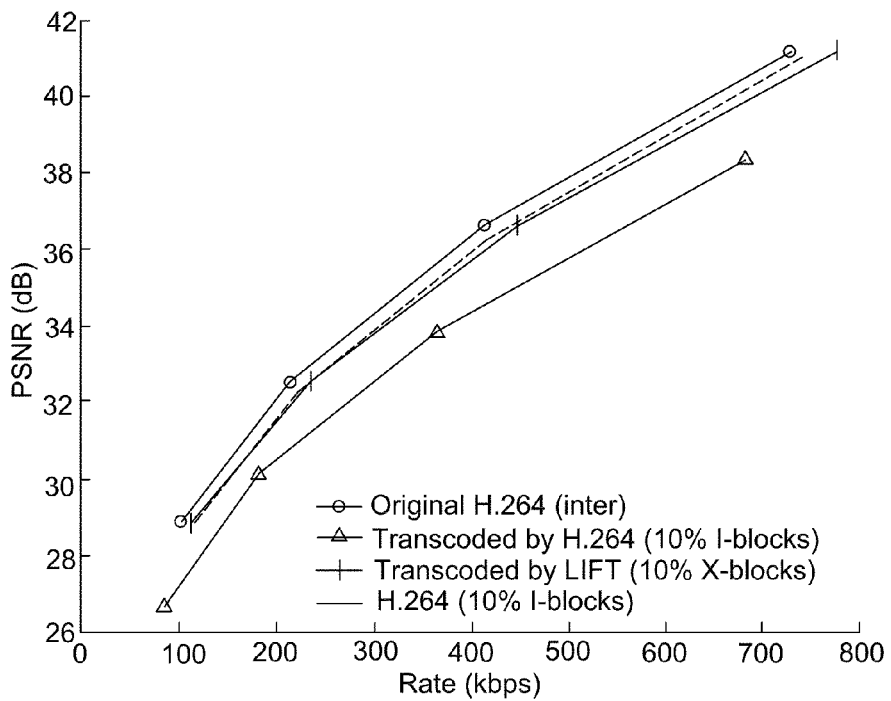
Figure 11C:
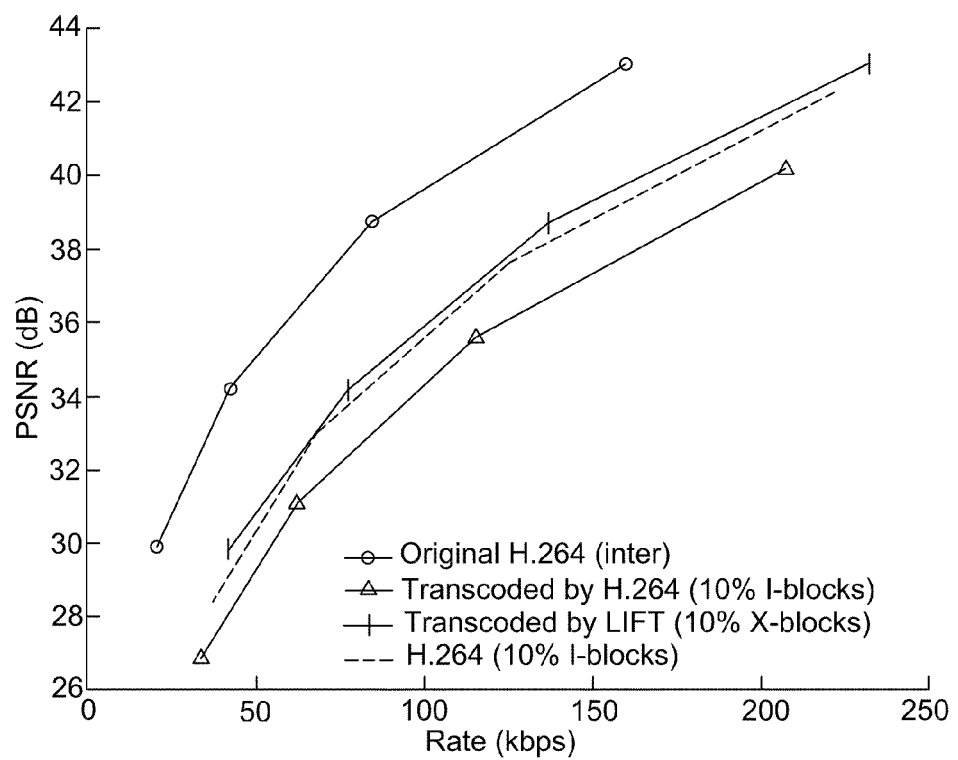
Figure 12A:
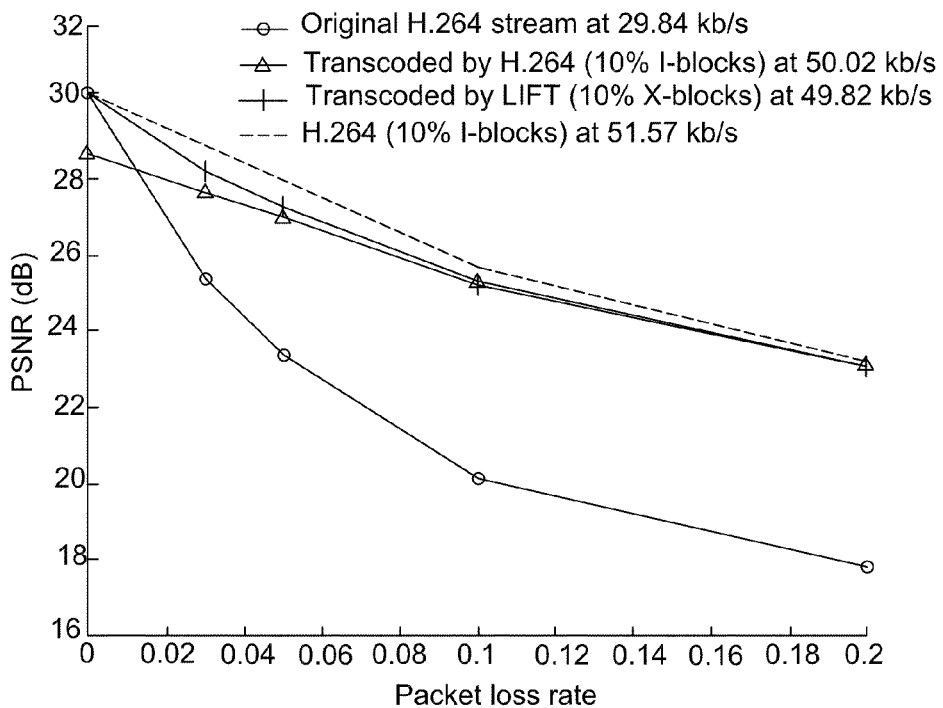
Figure 12B:
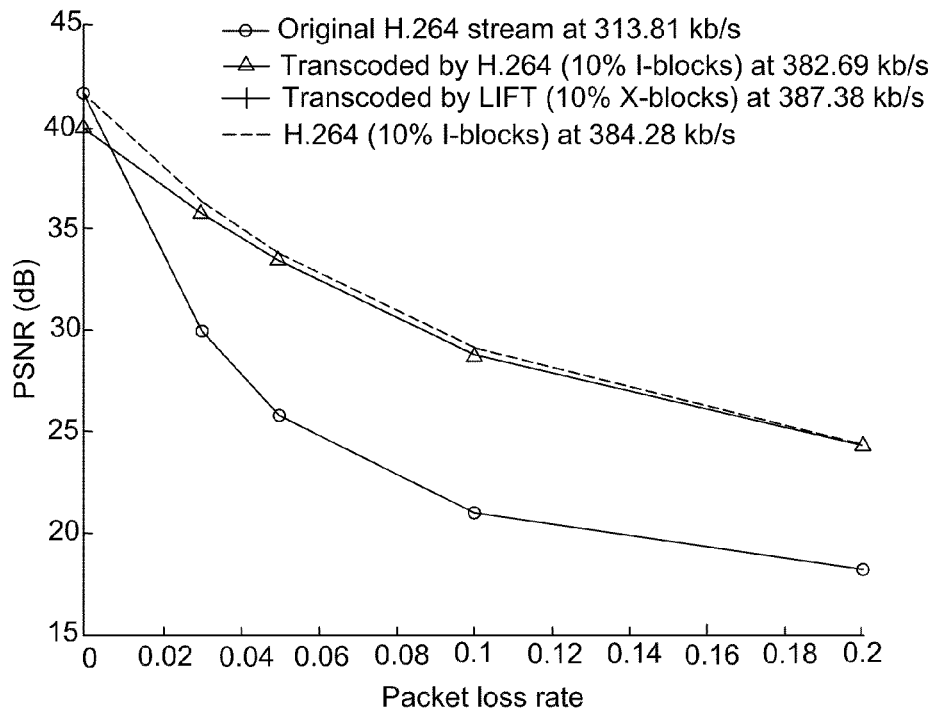

FIGS. 11A, 11B, and 11C depict the error resilience performance of the transcoder with fixed refresh rates; and FIGS. 12A and 12B depict the error resilience performance of the transcoder at different packet loss rate.

DETAILED DESCRIPTION OF THE INVENTION

Turning to the drawings and referring first to FIG. 1A, a system 100 is illustrated for providing video service based on video coding and compression techniques. In a video server 101, the original video 104 data is compressed and stored in memory. The server 101 then sends the compressed video data to a client 103 (such as a TV, PC or mobile video device) at the requests of users. Generally the compression of the video data follows some video coding standards as described above. According to these coding standards, video compression at the video encoder 102 generally involves a prediction function represented by block 106, a transform and quantization function represented by block 108 and an encoding function represented by block 110. The original video data 104 is encoded and compressed to the compressed video data 112.

At client 103, a series of inverse operations are applied by the video decoder 114 to the compressed video data 112 to restore the original video data. The inverse operations include a decoding function represented by block 116, an inverse transform and de-quantization function represented by block 118, and a reconstruction function represented by block 120.

Depending on the coding and decoding techniques and the properties of the channel for transmitting the compressed video data, the decoded video 122 may be a lossless reconstruction, which is a perfect copy of the original video 104, or may be a lossy reconstruction, which contains errors caused by encoding and transmission.

In existing video coding standards, each video frame is compressed and encoded on a block-basis. In particular, a video frame to be encoded is processed and separated into a number of blocks, commonly called macroblocks. The term "block" is used herein to refer to macroblock for ease of discussions. A typical block has an array of image pixels and usually has a size of 4×4, 8×8, 16×16, etc.

Figure 1B:
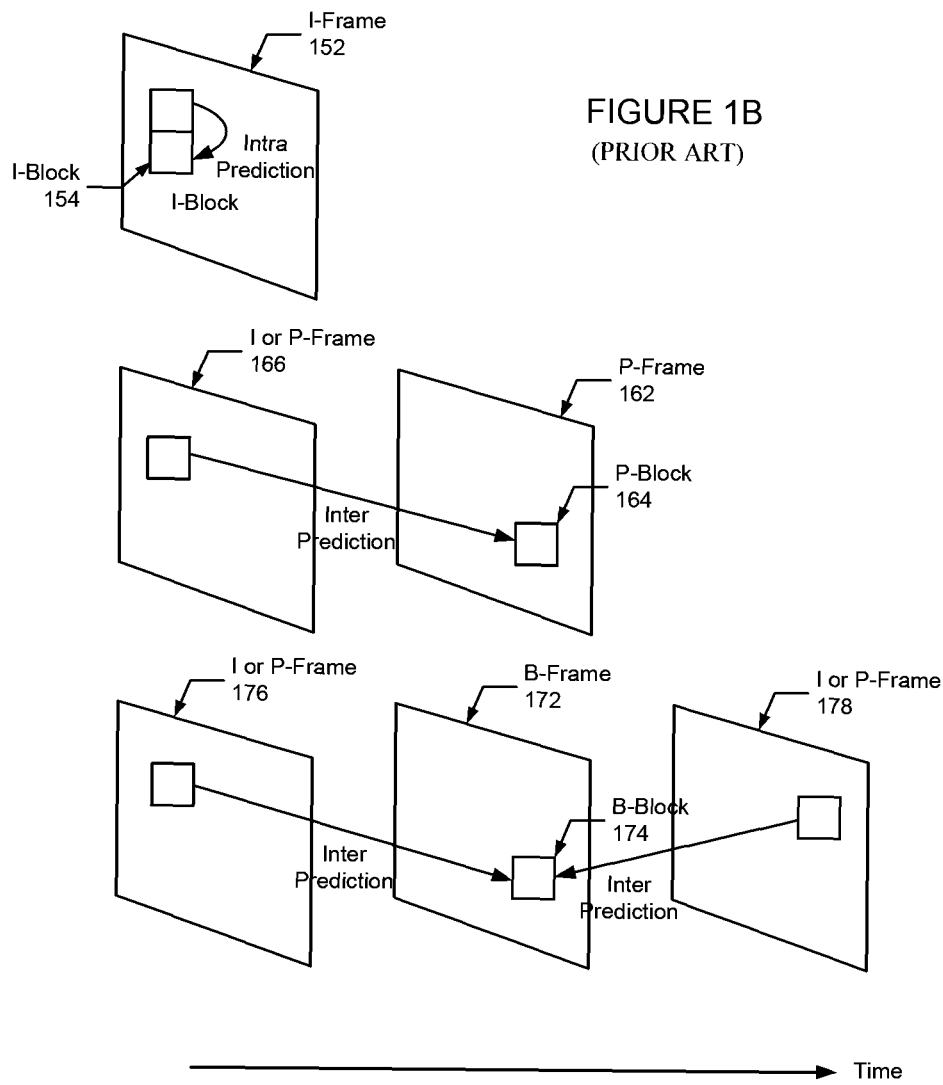
FIG. 1B illustrates I, P, and B-frames and their relationship with other video frames.

Now turning to FIG. 1B, three types of frames and their blocks defined in video compression standards are illustrated. Each frame and block type exploits a different type of redundancy existing in video sequences and consequently results in a different amount of compression efficiency and different functionality.

An intra-frame such as frame 152 (commonly called intra-coded frame or I-frame) includes coded video data blocks 154 that are coded by exploiting only the spatial correlation of the pixels within the current frame without using any information from other frames. I-frames are utilized as a basis for decoding/decompression of other frames and provide access points to the coded sequence where decoding can begin. A predictive-frame such as frame 162 (commonly called P-frame) includes video data blocks 164 coded based on motion prediction from a so-called reference frame, i.e., a previously coded I or P-frame such as frame 166. A bidirectional-frame such as frame 172 (commonly called B-frame) includes video data block 174 coded based on predictions derived from previous coded frames (I or P-frames) before it, after it, or a combination of both. In FIG. 1B, B-block 174 in frame 172 is coded based on data from frame 176 before it and frame 178 after it. B-frames are not used as a reference for predictions of other frames.

For P and B-frames, the encoder will, for each block in the frame, perform a motion estimation to search best match in the reference frames. For each data block, the best match in the reference frame will be used as the prediction. For ease of discussion hereinafter, the data blocks of an I-frame are generally referred to as the intra-coded blocks or I-blocks, and data blocks of the B and P-frames are generally referred to as the inter-coded blocks, or B and P-blocks, respectively.

Figure 2A:
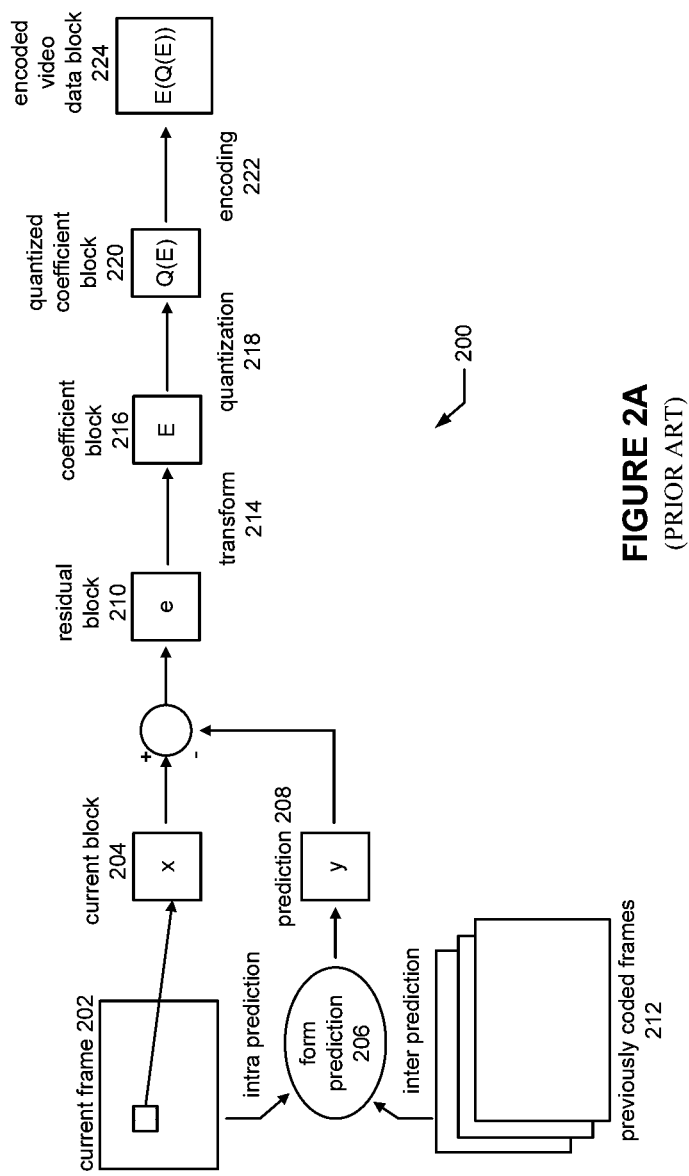
FIGS. 2A and 2B depict a video encoder and decoder, respectively, in accordance with existing video coding standards.
Figure 2B:
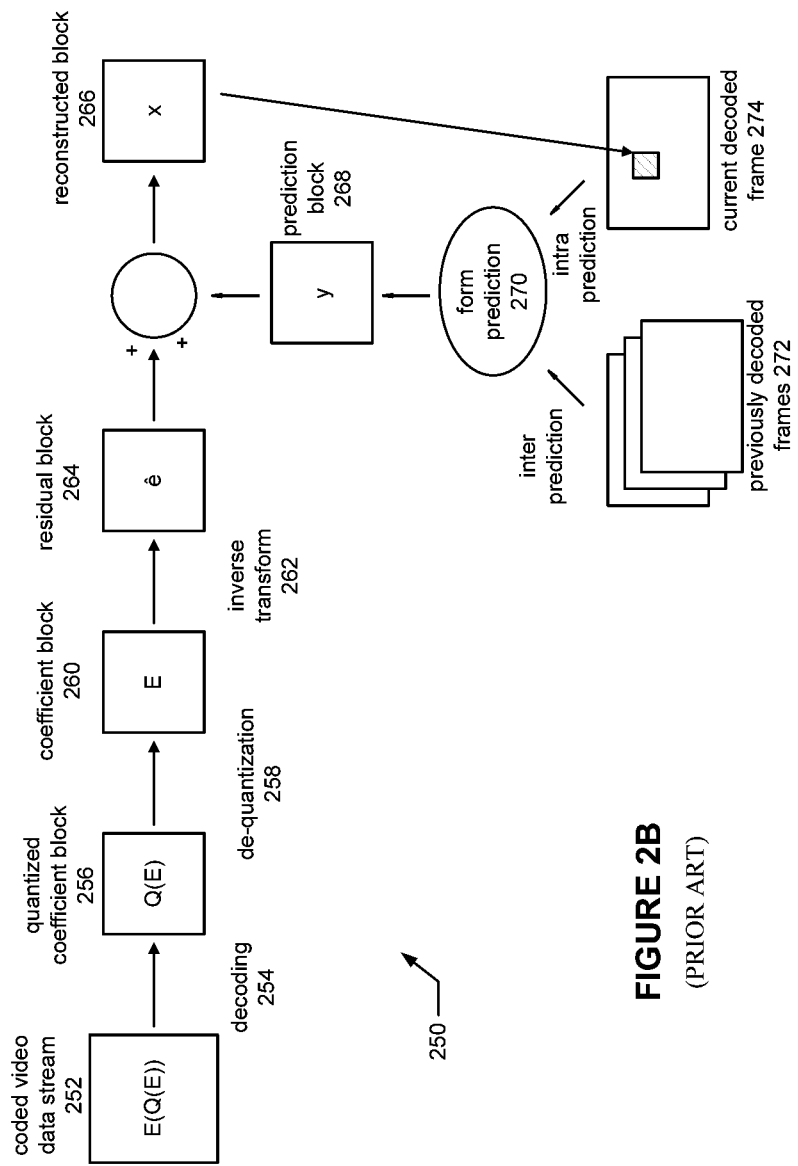

The detail operations of the encoder and decoder are described herein with reference to FIGS. 2A and 2B. FIG. 2A illustrates the encoding process carried out at a conventional video encoder 200. As illustrated in FIG. 2A, the encoder 200 first retrieves a block of video data x from frame 202 that is being encoded and forms a prediction block y associated with the block x. The prediction block y is formed based on data from either current frame 202 (i.e., intra prediction) or other frames that have already been coded (i.e., inter prediction). The encoder subtracts the prediction y from the current block x to form a residual block e. The residual block e is then transformed to generated the coefficient block E, which includes weighting values obtained based one a set of standard basis patterns. The coefficients block E is then quantized and encoded to form the encoded bitstream for transmission.

At the decoder side 250 as depicted in FIG. 2B, the inverse operations are applied to the encoded video data 252 to reconstruct the original video source data (reconstructed block 266). Specifically, the received video data block 252 is decoded (254), de-quantized (258), and inverse transformed (262) to obtain a reconstruction of the residual block ê (264). This process also generates the quantized coefficient block 256 and coefficient block 260, which are the reconstructions of the quantized coefficient block 220 and coefficient block 216, respectively. If the data block 266 is intra-coded (i.e., I-block), the original video data block x is then reconstructed by combining reconstructed residual block ê (264) with prediction block y (268) generated by the prediction process 270 based on current frame 274 (i.e., intra prediction). If, on the other hand, the video data block 266 is inter-coded (i.e., P or B-block), the original video data block x is then reconstructed by combining ê (264) with prediction y (268) generated based on other frames 272 (i.e., inter prediction).

Lossless Inter-Frame Transcoding (LIFT)

Figure 3:
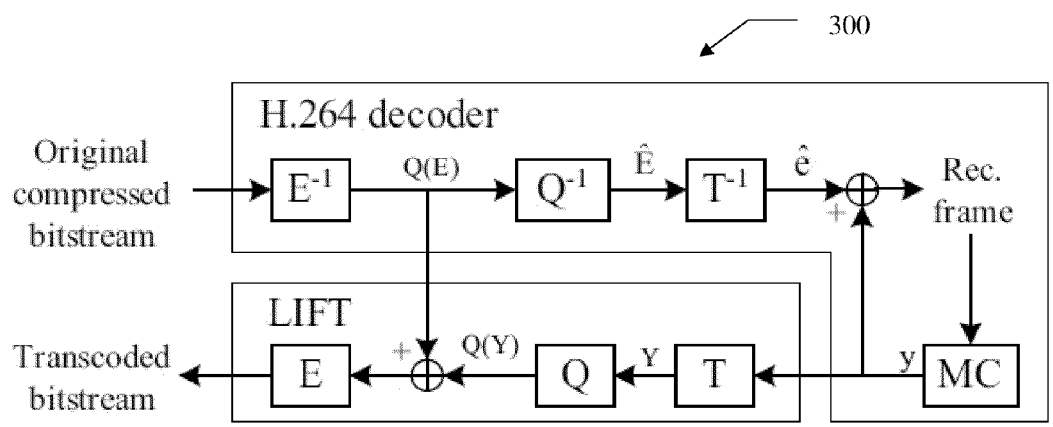
FIG. 3 depicts a lossless inter frame transcoder according to one embodiment where the transcoded block is generated from a conventional coded video data block such as I-, P-, or B-block.

According to one embodiment of the invention depicted in FIG. 3, a previously compressed video stream having conventional coded I, P, and B-blocks is losslessly converted by a transcoder 300 to a transcoded video stream. Specifically, one or more coded data blocks of the previously compressed video stream are transcoded to newly coded data blocks to achieve error robustness similar to that of intra-coded blocks. The LIFT technique re-encodes the conventional coded block such that it can be recovered losslessly when there is no transmission error, and can also be decoded robustly when the corresponding prediction block y is not available.

In keeping with the embodiment, the I, P, and B-block of the video stream can be converted to an LI, LP, and LB-blocks, respectively. As shown in FIG. 3, the input of the LIFT transcoder is the quantized residual block Q(E) and the prediction block y obtained from either the current frame or the other frames. The prediction y is transformed and then quantized to get the quantized prediction block Q(Y). Then the sum Q(E)+Q(Y) are entropy coded to obtain the transcoded block that is used to replaces the original coded block Q(E) in the video stream.

With reference to FIG. 3, an LI-block, similar to an I-block, has intra-frame prediction information but no motion vector information. As shown in FIG. 3, in generating the LI-block, the I-block is first fully decoded to reconstruct the original video data (i.e., reconstructed frames). A predicted block y is then calculated using the intra-frame prediction information obtained from the frame data that has been reconstructed. The prediction block y is transformed to obtain the transformed prediction block Y which is then quantized to obtain the quantized and transformed prediction block Q(Y). The transformed and quantized prediction block Q(Y) is then added to the decoded I-block Q(E). The summation Q(Y)+Q(E) is then encoded to obtain the LI-block.

Similar to a P-block, an LP-block generated from the P-block by the transcoder 300 has one motion vector with respect to a reference frame. As shown in FIG. 3, the P-block is first fully decoded to recover the original video data. A prediction block y corresponding to the raw video data block x is obtained using the motion compensation (MC) and the reference frame that has been decoded. The predicted block y is transformed and quantized to obtain Q(Y). The quantized and transformed residual Q(E) is then added to the quantized and transformed prediction block Q(Y). The summation Q(E)+Q(Y) is then encoded to obtain the LP-block.

Similar to a B-block, an LB-block has two or more motion vectors with respect to other reference frames. In generating the LB-block, the B-block is first fully decoded to recover the original video data. a predicted block y is obtained from motion compensation (MC) based on the multiple motion vectors and their corresponding reference frames. The prediction block y is then transformed and quantized to obtain the quantized and transformed prediction block Q(Y), which is then added to Q(E). The summation Q(E)+Q(Y) is then encoded to obtain the LB-block.

In keeping with this embodiment, the I, P, and B-blocks of the original compressed bitstream are generated from the raw video data blocks x using a video coding technique that complies with a video coding standards. For example, these blocks may be generated based on existing video coding standards such as H.261, H.262, H.263, H.264/AVC, MPEG-2, MPEG-4, AVS-M, AVS1.0, and H.264/SVC. As another example, these data blocks may also be generated by other coding techniques that utilize motion compensation for calculating inter or intra-frame prediction information. As described above, in the original compressed bitstream, the I-block refers to any block that relies on intra-frame prediction information, while the P- and B-blocks refer to blocks that rely on inter-frame prediction information.

One skilled in the art will also appreciate that in order for the LIFT transcoder to operate properly, the transform T, quantization Q, and encoding E of the LIFT transcoder depicted in FIG. 3 should comply with the video coding technique used to generate the previously compressed video bitstream. Specifically, such video coding technique generally utilizes transform, quantization, and encoding operations for encoding video data.

Figure 5:
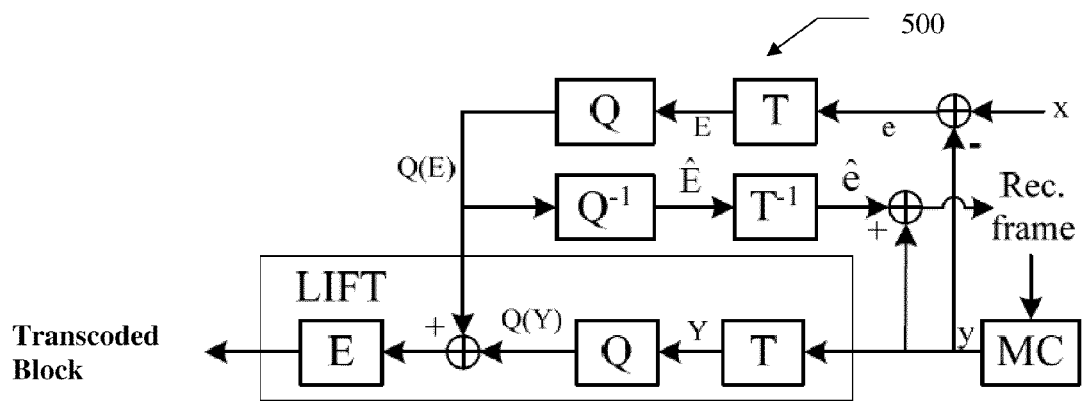
FIG. 5 depicts an encoder for generating a transcoded data block by directly encoding the original video data.

According to an alternative embodiment 500 depicted in FIG. 5, the LI, LP, and LB-blocks are generated directly from the raw video data block x. In keeping with this embodiment, a residual block e is first generated by subtracting the prediction block y from the video data block x. The residual block e is then transformed and quantized to obtain the coefficient block Q(E). The prediction block y associated with the video data block x is further transformed and quantized to obtain the quantized and transformed prediction block Q(Y) which is added to the coefficient Q(E). The summation Q(Y)+Q(E) is then encoded to obtain the transcoded block.

In keeping with this embodiment, depending on the prediction data block y used in the process, the transcoded block is one of an LI, LP, and LB-blocks. Specifically, when the prediction data block y is obtained from the current video frame that is being encoded, the transcoded block is an LI-block. When the prediction data block is taken from frames other than the current frame that is being coded, the transcoded block is an LP or LB-block.

Again, similar to those depicted in FIG. 3, the transform T, quantization Q, and encoding E of the LIFT transcoder depicted in FIG. 5 comply with video coding standards including H.261, H.262, H.263, H.264/AVC, MPEG-2, MPEG-4, AVS-M, AVS1.0, H.264/SVC, or any coding standard that utilize motion compensation, transform, quantization, and encoding operations.

Lift Decoder

Figure 4:
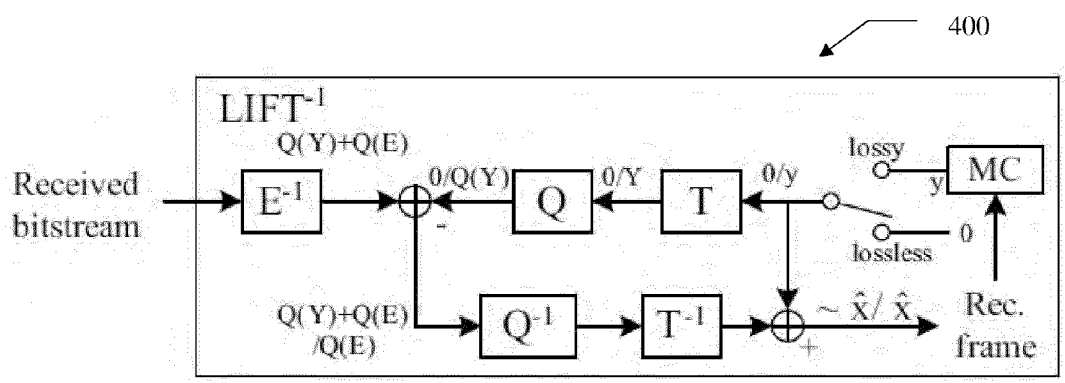
FIG. 4 depicts a decoder for reconstructing the original video data by directly decoding the transcoded data block generated by the transcoder depicted in FIG. 3.

According to an embodiment shown in FIG. 4, at the LIFT decoder 400, one of two decoding schemes is selected to decode the received transcoded data, depending on the availability of the prediction block y.

As shown in FIG. 4, if the prediction block y associated with the received transcoded data is available, a lossless decoding scheme is selected. Specifically, the received data block is first decoded to recover the summation Q(Y)+Q(E). The quantized and transformed prediction block Q(Y) is obtained from the prediction block y by motion compensation (MC), transform T and quantization Q. The quantized and transformed prediction block Q(Y) is then subtracted from Q(Y)+Q(E) to recover the coefficient block Q(E). The coefficient block Q(E) is then de-quantized $Q^{-1}$ and reverse transformed $T^{-1}$ to obtain the reconstructed residual block ê, which is then combined with the prediction block y to obtain the reconstruction of the original video data block x̂. In this decoding scheme, because both the quantized residue Q(E)

and the prediction y are available, the reconstructed signal $\hat{x}$ is a lossless reconstruction of the original video data x. The decoding process carried out in LIFT decoder 400 can be expressed as follows:

$$y + T^{-1}(Q^{-1}(Q(Y) + Q(E) - Q(Y))) = \qquad (1)$$
$$y + T^{-1}(Q^{-1}(Q(E))) = y + T^{-1}(\hat{E}) = y + \hat{e} = \hat{x}$$

In case that the prediction y is not available due to packet loss, the received transcoded data can still be robustly decoded because Q(Y)+Q(E) can be considered as an approximation of Q(X), the quantized transform of the original video data block x. In this decoding scheme, Q(Y)+Q(E) is first decoded from the received data and then de-quantized and inverse transformed to obtain a lossy reconstruction $\hat{x}$ of the video data block x. The decoding process can be written as:

$$T^{-1}(Q^{-1}(Q(Y) + Q(E))) \approx T^{-1}(Y + \hat{E}) = y + \hat{e} = \hat{x} \qquad (2)$$

According to this embodiment, the decoder can recover the original video data block x, losslessly or lossily, depending on whether the prediction block y is available. As discussed above, the transcoded video data blocks have inter-coded properties where the original video data can be losslessly reconstructed when the prediction blocks are available. On the other hand, the transcoded data blocks can also achieves intra-coded robustness where the a lossy reconstruction can be generated to approximate the original video data when the prediction blocks are not available due to packet loss. Furthermore, because the magnitude of Q(Y)+Q(E) is larger than Q(E) and is similar to Q(X), the transcoded data blocks retain a bit rate similar to conventional intra-coded data.

Figure 6:
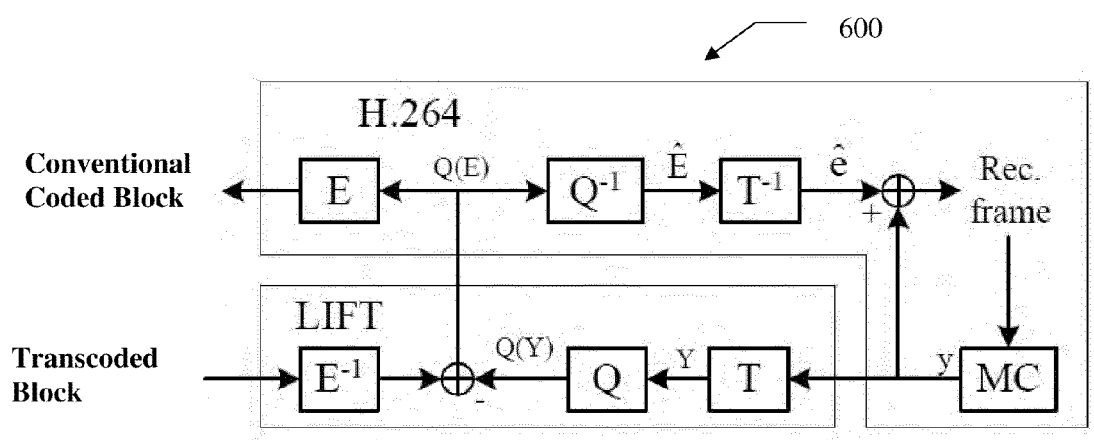
FIG. 6 depicts a decoder for converting a transcoded data block to a conventional coded data block that can be decoded by conventional decoder.

According to another embodiment, the transcoded data blocks (i.e., LI, LP, and LB-blocks) may be converted back to conventional coded data blocks (i.e., I, P, and B-blocks) at the LIFT decoder. FIG. 6 depicts a LIFT decoder 600 in keeping with this embodiment. Specifically, the transcoded data block received at the decoder is first decoded to obtain the decoded data Q(E)+Q(Y). The quantized and transformed prediction block Q(Y) obtained from the prediction block y associated with the current video data block x is subtracted from the decoded data Q(E)+Q(Y). The resulting data is the coefficient block Q(E) associated with the video data block x which is then encoded to obtain to the conventional coded data block (i.e., I, P, and B-blocks). In addition, the coefficient Q(E) is further de-quantized $Q^{-1}$ and inverse transformed $T^{-1}$ to recover the residual block e, which is then combined with the prediction block y and used for reconstructing the video frame.

Unlike decoder 400 that directly decode the video data, the outputs of LIFT decoder 600 are conventional coded data blocks that can be subsequently decoded using decoders, which comply with a video coding standard such as H.261, H.262, H.263, H.264/AVC, MPEG-2, MPEG-4, AVS-M, AVS1.0, H.264/SVC or any video coding standard that utilizes motion compensation, transform, quantization, and encoding operations for encoding the raw video data. In addition, the encoding E, transform T, quantization Q, decoding $E^{-1}$, inverse transform $T^{-1}$, and de-quantization $Q^{-1}$ in LIFT decoder 600 are consistent with those components of corresponding LIFT encoders 300 and 500.

Video Server with Adaptive Error Robustness

Figure 7A:
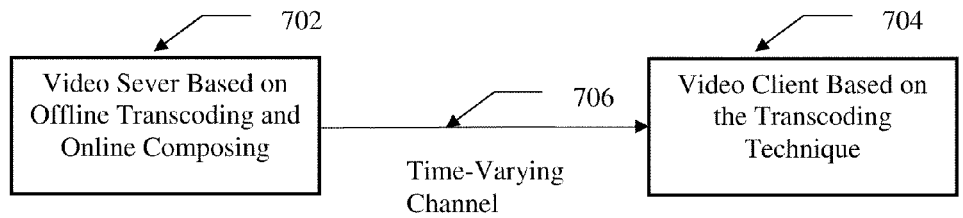
FIG. 7A depicts a system for providing video service over a time-varying channel based on the offline transcoding and online composing technique.

According one embodiment depicted in FIG. 7A, a video server 702 is provided for providing users (or client) 704 with robust digital video services over time-varying channels 706 using the LIFT transcoding technique described above. For time-varying channel 706, such as wireless channels, Wi-Fi/Wi-Max, 3G/3.5G/4G, Bluetooth, wired channels, internet, IP-network, etc., conventional offline transcoding can hardly achieves optimal error resilience performance due to the absence of the channel status information, while online transcoding is too complicated especially when there are multiple clients, each with different channel status. In order to solve these problems with existing systems, the video server 702 in keeping with the embodiment performs offline transcoding using the transcoding technique described herein and online composing to achieve adaptive error robustness for time-varying channels 706.

Figure 8:
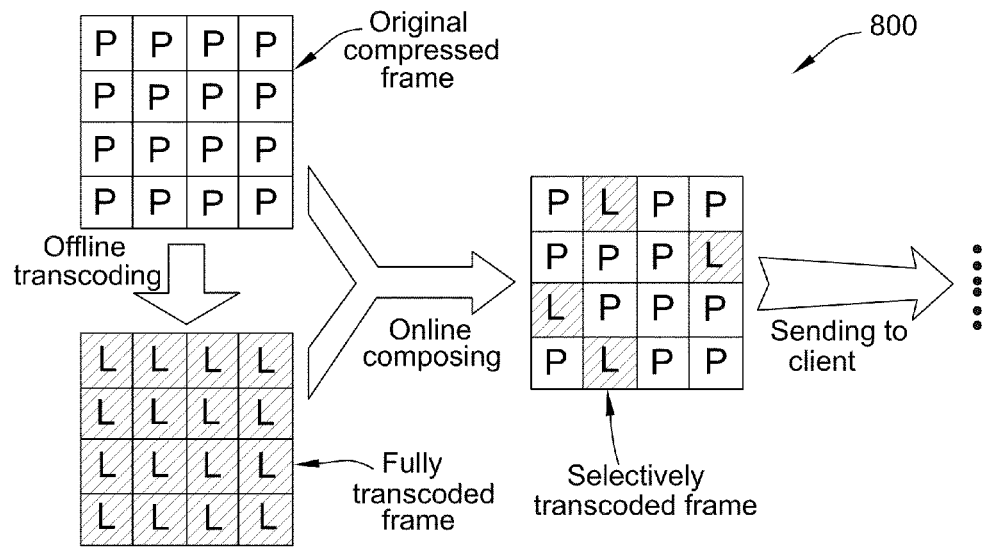
FIG. 8 illustrates an online composing process for selectively combining conventional coded block and transcoded blocks for transmitting video data.

FIG. 8 depicts one example of the offline transcoding and online composing technique 800 performed by the video server 702. Given a conventional coded P-frame including P-blocks, the server 702 first offline transcodes all the P-blocks to corresponding LP-blocks (denoted as "L" in FIG. 8 for ease of illustration) and stores both the P-blocks and the LP-blocks in the storage space. When streaming the video, rather than sending the video data using only the P-blocks as in the conventional techniques, the video server 702 performs online composing to generate a composite coded frames using both P-blocks and LP-blocks as described below.

As shown in FIG. 8, when a composite coded video frame is constructed by the video server 702 for transmission, one of more of the P-blocks are replaced with the LP-blocks. Alternatively, the server 702 may replace one or more LP-blocks in the transcoded frame with the corresponding P-blocks. The effects of these two approaches are similar.

In keeping with the embodiment shown in FIG. 8, the LP-blocks and the P-blocks can arbitrarily replace each other. Alternatively, the LP-blocks can replace the corresponding P-blocks in a predetermined pattern. For example, every other P-block or every other two P-blocks of a video frame is replaced with the corresponding LP-block. Other patterns may also be used to compose the video frame using the P and LP-blocks.

The video server 702 further adjusts the ratio of PL-blocks (i.e., the percentage of the PL-blocks within a composite coded frame) according to the packet loss rate p measured at the client end (i.e., receiver). To this end, the client measures the packet loss rate p by monitoring the received data packets and reports the packet loss rate p to the video server 702 by way of acknowledgements or other feedback mechanisms. When the video server 702 detects that packet loss rate p increases or has an upward trend, it increases the radio of the PL-blocks (i.e., more LP-blocks and less P-blocks are used) so that the video stream becomes more robust in environments where packet loss rate is high. On the contrary, when the packet loss rate decreases or has a downward trend, the server 702 decrease the ratio of the PL-blocks (i.e., more P-blocks and less LP-blocks are used) to transmit the video frames.

Alternatively, the video server 702 compares the packet loss rate p with a predetermined threshold. If the packet loss rate received from the client is over the threshold, indicating the video stream is subject to more packet losses, more LP-blocks are used to compose the video frame so that the data blocks can still be decoded when the prediction blocks are unavailable due to packet losses. On the contrary, if the packet loss rate is lower than the threshold, indicating that the transmitting quality is high and packet loss is minor, more P-blocks are used to transmit the video data.

Still alternatively, a higher and a lower thresholds are used to adjust the ratio of LP-blocks in a video frame. Specifically, when the packet loss rate falls between the higher and lower thresholds, the ratio of LP-blocks is set to a preset value. When the packet loss rate becomes lower than the lower threshold, the ratio is decreased so that less LP-blocks are used to transmit the video data. When the packet loss rate becomes higher than the higher thresholds, the ratio is increased so that more LP-blocks are used to transmit the video data stream, thereby ensuring the robustness of the transmission. After reading this description, one skilled in the art will appreciate that other mechanisms are also suitable for adjusting the ratio of transcoded blocks in a video frame for improving the robustness of the video service.

The P and PL-blocks are merely utilized as an example for illustrating the offline transcoding and online composing technique in the video server 702. They are not intended to limit the scope of the invention. Specifically, the same offline transcoding and online composing technique can be utilized on other block types including the I, B, LI, and LB-blocks. For example, the a video frame can be constructed to include the B and LB-blocks or the I and LI-blocks in order to improve the robustness of the video service. Similarly, the ratio of the transcoded blocks (i.e., LI and LB-blocks) in these composite coded frames can also be adjusted according to the packet lost rate.

According to a further embodiment, the video sever optimizes the ratio and the locations of the transcoded blocks. Because the transcoded blocks have a bit rate and robustness in a lossy environment similar to those of intra-coded blocks, the optimization is similar to the problem of intra refresh described in G. Cote and F. Kossentini, "Optimal intra coding of blocks for robust video communication over the Internet," Signal Processing: Image Communication, vol. 15, no. 1, pp. 25-34, 1999 (hereinafter "Cote"), which is hereby incorporated by reference. According to Cote, the optimal intra refresh rate is approximately equal to the packet loss rate p. According to this embodiment, the ratio of the transcoded blocks is thus set to the packet loss rate p in the composite frame. The position of the transcoded blocks in the composed frame is selected randomly or according to a predetermined pattern as describe above. Alternatively, when the original video is available as reference for distortion calculation, the position of the transcoded blocks in the composed frame is selected according to the rate-distortion optimization (RDO) described in R. Zhang, S. L. Regunathan, and K. Rose, "Video coding with optimal inter/intra-mode switching for packetloss resilience," Selected Areas in Communications, IEEE Journal on, vol. 18, nol. 6, pp. 966-976, 2000, which is hereby incorporated by reference.

In still an alternative embodiment of the video server 702, to further improve the error robustness, a given compressed video stream generated by the online composing technique can also be re-encoded to add more I-blocks. One skilled in the art will readily recognize that this recompression introduces transcoding distortion while the LIFT method is lossless. More importantly, the proposed scheme 800 can perform offline transcoding and then online adjust the number of transcoded blocks according to the packet loss rate. However, the recompression method in existing system can not online adjust the number of I-blocks if performed offline, and is too complicated if performed online especially when there are multiple clients with different packet loss rate.

According to a further embodiment, the DC components of the summation Q(E)+Q(Y) involved in the transform and quantization of the transcoded block are predicted from neighbor blocks. The motion vectors is kept in the bitstream. In addition, a binary map is compressed with the video data to indicate whether a block in a video data stream is a conventional coded block or transcoded block. For example, each binary value of the binary map is associated with a coded block for indicating whether the coded block is conventionally coded or transcoded.

Figure 9:
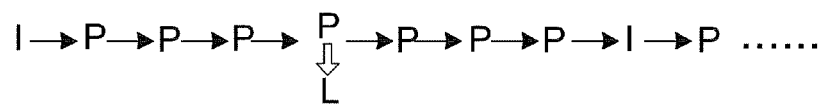
FIG. 9 illustrates a method for adding a random access point to a video stream by transcoding a conventional coded video frame to a transcoded video frame.

According to another embodiment, in addition to generating composed video frames using both conventional coded blocks and transcoded block, the video server 702 further replaces an entire conventional coded frame with a transcoded frame for transmitting the video data. Specifically, the server performs offline transcoding to convert all of the conventional blocks of a video frame to the transcoded blocks. When streaming the video data, the server transmits a frame including only the transcoded data blocks (i.e., a transcoded frame) in the place of the original coded frame having only the conventional coded blocks (i.e., a conventional coded frame). Depending on the coded scheme used in to the coded blocks, the conventional coded frame may be an I, P, or B-frame and the transcoded frame may be a LI, LP, and LB-frame. One example is depicted in FIG. 9, where a P-frame in a video stream is replaced with its corresponding L-frame for transmission. One skilled in the art will appreciate that similar operation can be performed on the I and B-frames for transmitting the video data.

In traditional video streaming system, random access can only happen at the I-frame (i.e. the decoder can only start decoding from I-frame rather than P or B-frame). In contrast, the server 702 described herein can add random access points by transcoding some conventional coded frame into transcoded frames. This is because the transcoded frames can be decoded independently without reference frames, thereby allowing the client to re-synchronize the video data and providing the client with additional random access point in the video stream.

Figure 10A:
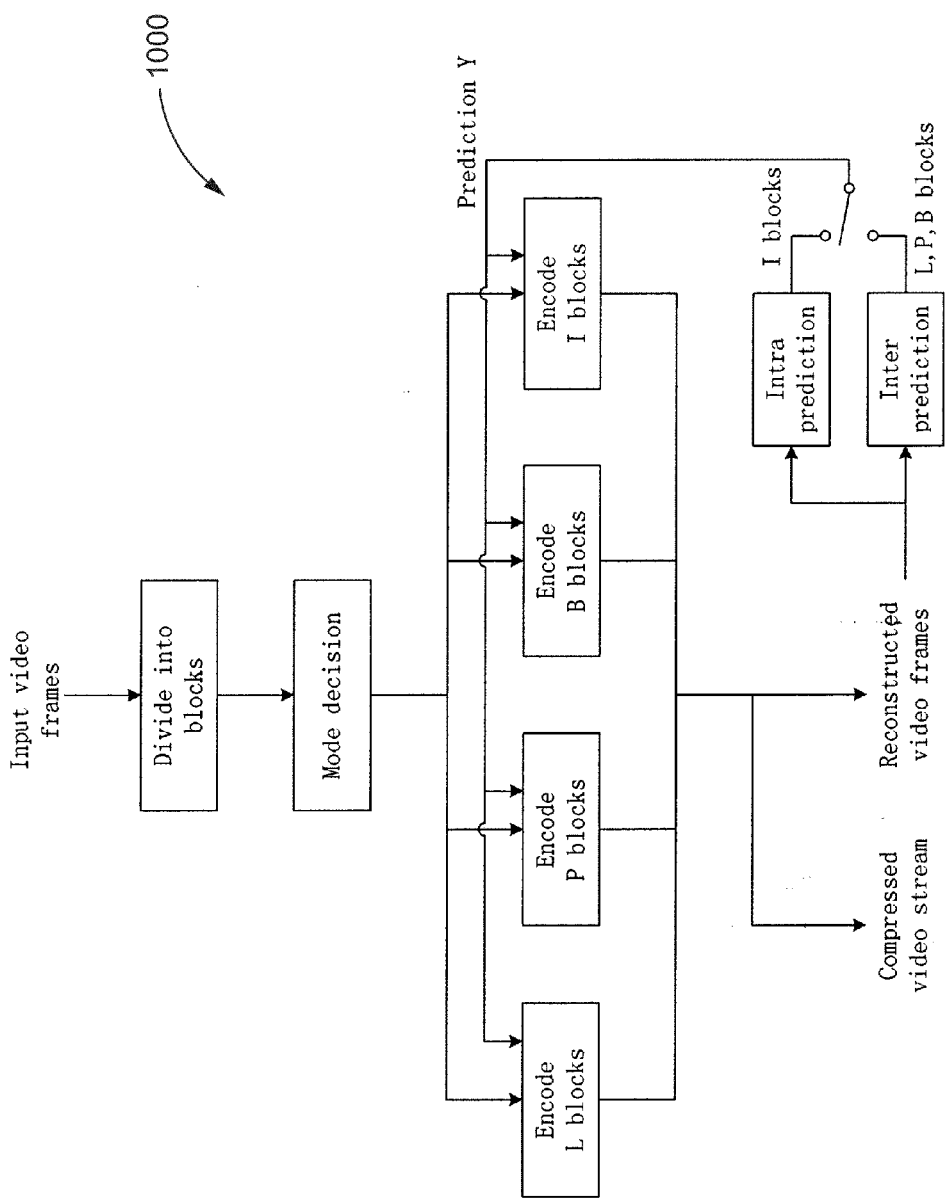
FIG. 10A illustrates a method for encoding video data according to one embodiment.

According to another embodiment as shown in FIG. 10A, a method 1000 is described for providing a video service based on digital video data having a number of blocks. In keeping with this embodiment, the method first divide the input video frames into blocks. Each block has a size of 4×4, 8×8, or 16×6. Then the encoder encode the blocks into one of the L, P, B, and I-blocks. Here, the L-block generally refers to the transcoded blocks including the LI, LP, and LB-blocks corresponding to the I, P, and B-blocks, respectively. For I-block, the encoder encodes the block by utilizing intra frame prediction (i.e. using reconstructed pixels in the current frame as the prediction block). For P and B-blocks, the encoder encodes the block by utilizing inter frame prediction (i.e. using pixels in the previously encoded frames and/or later coded frames as the prediction block). As described above, the L-block can be constructed from one of the I, P, and B-blocks, or it can be constructed directly from the original video data. Depending on where the prediction block is taken from in generating the L-blocks, the L-block may be one of the LI, LP, and LB-blocks.

After compressing all the blocks in each frame, the encoder composed a compressed frame using these blocks as described above and output the composite frame (e.g. writing the compressed video data into a file in the video server, or transmitting the coded data blocks onto a network). When the compressed video data is transmitted on a communication channel having time-varying properties, the method further includes adjusting the ratio of the transcoded blocks in the composed video frame as discussed earlier.

Video Client

Figure 10B:
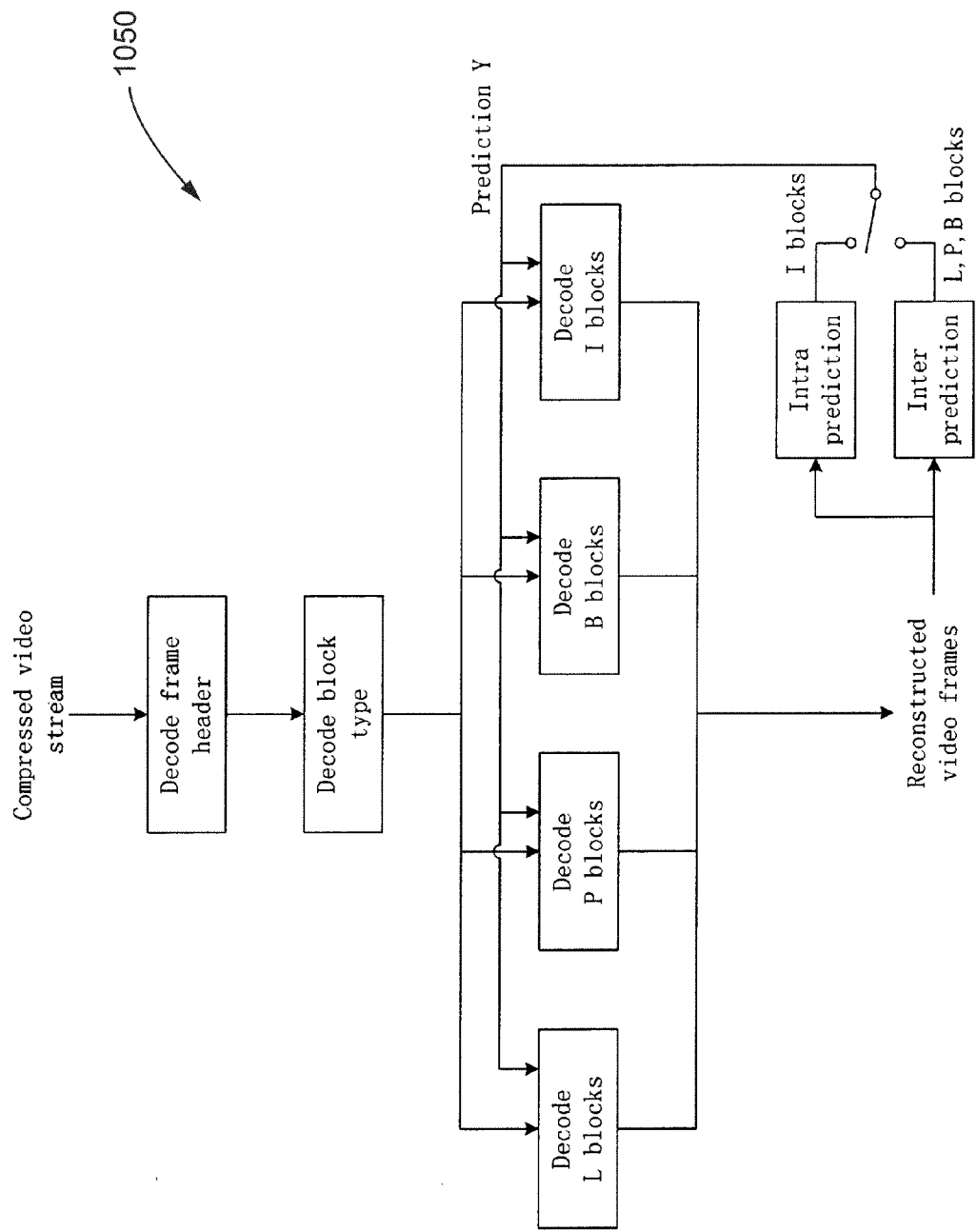
FIG. 10B illustrates a method for decoding video data having transcoded data blocks.

At the client end 704, a method 1050 is provided for decoding the video data in keeping with the decoder described above. Again, the L-block here generally refers to the transcoded blocks including the LI, LP, and LB-blocks corresponding to the I, P, and B-blocks. Specifically, as depicted in FIG. 10B, the method 1050 first reads the incoming bit stream carrying the coded frame and decodes the frame header. The type of the coded block is determined based on the frame header. The bit stream is decoded in accordance with the type of each block. For the I-blocks, the intra frame prediction is used to decode the coded block. For P or B-blocks, the inter frame prediction is used to decoded the data.

In decoding the L-block, one of the decoding schemes is selected based on the availability of the prediction block. Specifically, when the prediction block is available for the L-block, the transcoded L-block is converted back to the conventional coded I, P, or B-blocks which are then subsequently decoded using the conventional decoder. Alternatively, the transcoded L-blocks can be directly decoded to obtain a lossless reconstruction of the video data block x. On the other hand, when the prediction is not available, the transcoded L-blocks can still be decoded to obtain a lossy reconstruction of the original video data block. After decoding all the blocks in each frame, the original frame is reconstructed by combing the decoded data blocks.

In addition to decoding the video data stream, the client 704 also monitors the packet loss rate p of the transmission channel 706 and report that packet loss rate p to the video server 702 for adjusting the ratio of the transcoded data blocks in the subsequent video frames. For example, the client 704 periodically reports the packet loss rate p by way of acknowledgement in response to receiving the packets. Alternatively, the client 704 reports the packet loss rate p only when the rate p has a significant change that requires the video server 702 to adjust the ratio of the transcoded blocks in the subsequent video stream.

Figure 7B:
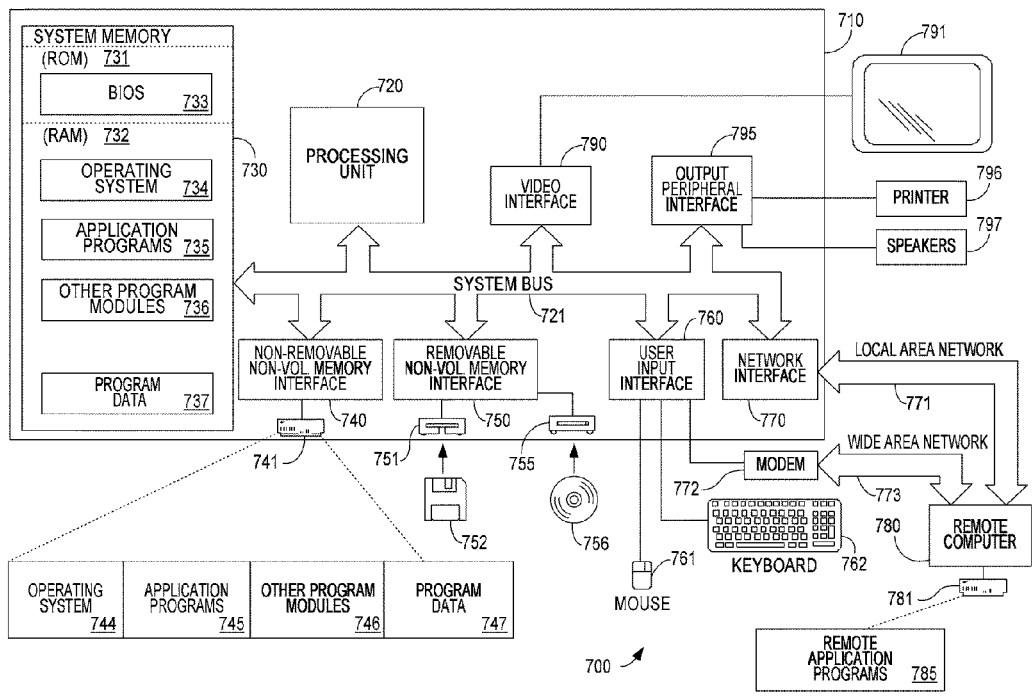
FIG. 7B depicts a computing environment for implementing the video encoder, decoder, video server, and video client for providing video service based on the transcoding technique.

Computer System for Implementing the Video Encoder, Video Server, Video Decoder, and Video Client FIG. 7B illustrates an example of a suitable hardware system 700 in which the various aspects of the invention can be implemented. The hardware system 700 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable electronics, network PCs, minicomputers, mainframe computers, distributed computing environments that include any of the above systems or devices, and the like.

With reference to FIG. 7B, an exemplary system 700 for implementing the video encoder, server, decoder, or client described herein. System 700 includes a computing device, such as device 710. In its most basic configuration, device 710 typically includes a processing unit 720 and a system memory 730. Depending on the exact configuration and type of computing device, system memory 730 may include volatile memory (such as RAM 732), non-volatile memory (such as ROM 731) or some combination of the two. Additionally, system 700 may also have mass storage units including non-removable memory 741 such as hard disks and/or removable memory such as conventional floppy disk 752, or optical disks (CD/DVD) 756, or flash memory devices. Similarly, system 700 may also have input devices such as mouse 761, keyboard 762, and/or output devices such as a display unit 791, printer 796, and speakers 797. Other aspects of system 700 may include network connections to other devices, computers, networks, servers, etc. using either wired or wireless media. For example, system 700 may further include modem 772 and network interface 770 for communicating with a remote computer 780 through a wide area network (WAN) 773 and/or a local area network (LAN) 771. Additionally, device 710 further includes a system bus 721 that electronically connects processing unit 720, various memory modules, input/output devices, and other functional components described above. Accordingly, processing unit 720 may directly read and write data to system memory 730. It may further exchange data with various input/output devices and networking devices through various interfaces such as memory interfaces 740 and 750, user input interface 760, network interface 770, video interface 790, and output peripheral interface 795. All these devices are well know in the art and need not be discussed at length here.

The encoding and decoding techniques and the video server 702 and client 704 described above may be implemented as one or more software programs running on general purpose digital processors similar to device 710. Specifically, the software programs for implementing the video encoding and decoding and the video server 702 and client 704 may include program codes for instructing various components of device 710 to execute the method steps described above. For example, the program codes may include functional modules and computer executable instructions for providing the functions of various components including the transform T, the quantization Q, the encoding E, the decoding $E^{-1}$, the de-quantization (i.e., re-scaling) $Q^{-1}$, the inverse transform $T^{-1}$, the motion compensation (MC), etc. In addition, the program codes further provides the functions for online composing and packet loss rate monitoring and reporting. Alternatively, the system may include separate computer programs, each of which is executed independently for providing the functions of encoder, decoder, video server, and video client described above.

Video Encoder and Video Server Programs

In keeping with the embodiments described above, the video encoder program codes include instructions for encoding a video data block x to a conventional coded data block (i.e., I, P, or B-block), instructions for converting the conventional coded data block to a transcoded data block (i.e., LI, LP, or LB-block) incorporating a prediction block y and a residual block e associated with the video data block x, and instructions for transmitting the transcoded data block to a decoder for decoding.

In particular, the instructions for encoding the video data block x further include instructions for forming the prediction block y associated with the video data block x, instructions for calculating the residual block e by subtracting the prediction block y from the video data block x; instructions for transforming the residual block e to obtain E, instructions for quantizing the transformed residual block E to obtain Q(E); and instructions for forming the coded data block E(Q(E)) by encoding the quantized transformed residual block Q(E). As discussed above, the conventional coding block is one of an I, P, and B-blocks. For I-block, the prediction y is obtained from intra-frame prediction based on data in the current video frame. For P and B-blocks, the prediction y is obtained from inter-frame prediction based on data in the previous coded frame and/or the subsequent coded frame.

In addition, the instructions for converting the conventional coded data block to the transcoded data block further include instructions for decoding the coded data block into the quantized transformed residual block Q(E), instructions for forming the prediction block y corresponding to the video data block x, instructions for transforming and quantizing the prediction block y to obtain Q(Y), instructions for summing the quantized transformed residual block Q(E) and the quantized transformed prediction block Q(Y), and instructions for encoding the summation Q(E)+Q(Y) and generating the transcoded data block. As discussed above, the transcoded coded block is one of an LI, LP, and LB-blocks. For LI-block, the prediction y is obtained from intra-frame prediction based on data in the current video frame. For LP and LB-blocks, the prediction y is obtained from inter-frame prediction based on data in the previous coded frame and/or the subsequent coded frame.

In the process of converting the coded data blocks, the original video data frame is reconstructed. In particular, the computer codes further include instructions for forming an approximation of the residual block ê from the quantized transformed residual block Q(E), instructions for summing the approximation of the residual block ê and the prediction block y and generating a reconstruction of the video data block x̂, and instructions for incorporating the reconstruction of the video data block x̂ to a reconstruction of the video frame. The program codes further include instructions for performing motion compensation for generating the prediction block y.

The video server program codes include instructions for encoding each of the plurality of data blocks to a coded data block x, instructions for converting each of the plurality of coded data blocks (i.e., I, P, or B-block) to a transcoded data block (i.e., LI, LP, or LB-block) that incorporates a prediction block y and a residual block e associated with the coded data block x, instructions for transmitting at least one of the plurality of coded data blocks and at least one of the plurality of transcoded data blocks in a bit stream, and instructions for adjusting a ratio of the transcoded data blocks in the bit stream.

In adjusting the radio of the transcoded data blocks in the bit stream, the video server program codes further include instructions for receiving from a client an error parameter associated with the transmission over the computer network, and instructions for adjusting in response to the error parameter the ratio of the transcoded data blocks in the data stream. In keeping with a further embodiment, the error parameter received by the server program is the packet loss rate of the transmission channel, indicating the transmission quality.

In keeping with the embodiment, the video server program codes further include instructions for forming composite video data by replacing one or more of the plurality of coded data blocks with the corresponding one or more transcoded data blocks, instructions for generating a binary map, wherein each bit of the binary map corresponds to a block of the composite video data and the each bit of the binary map has a value indicating that the corresponding block is one of the coded data blocks or one of the transcoded data blocks, and instructions for incorporating the binary map into the bit stream for transmission to the decoder.

Furthermore, a video server may be a server program running on a general purpose computer. The video server program codes can be implemented by many programming languages, including but not limited to C, C++, Java, Basic and etc. The program compresses raw video data and stores the data into the storage space such as 741, 752, 756, 732, and 731 of FIG. 7B. The sever program listens to the network through the network interface 770 and waits for the connection requests from the client program running on another computer connected to the network such as computer 780. Once connected with the client compute 780, the server program transmits the compressed video data to the client program upon request.

Video Decoder and Video Client Programs

In keeping with another embodiment, the video decoder program codes include instructions for receiving a block of encoded video data that is conventionally coded or transcoded, instructions for determining the block of encoded video data to be a transcoded data block (i.e., LI, LP, or LB-block). The transcoded data block includes a prediction block y and a residual block e associated with a block of the video data x from which the block of the encoded video data is formed, instructions for determining an availability of the prediction block y associated with the block of the video data x, and instructions for selecting according to the availability of the prediction data block y one of a first and a second decoding schemes for decoding the transcoded data block.

In particular, the decoder program codes further includes instructions for receiving a binary map as described above including a plurality of binary values associated with the video data, and instructions for determining the block of encoding video data to be a transcoded data block based on one of the plurality of binary values corresponding to the block of encoded video data. For example, if the binary value associated with the block of video data is 0, the decoder determines the coded data block to be a conventional coded data block and decodes the coded data block using the conventional decoding technique such as those specified in the standards H.261, H.262, H.263, H.264/AVC, MPEG-2, and MPEG-4. If the binary value associated with the block of video data is 1, the decoder determines the coded data block to be a transcoded data block and then decodes the coded data blocks using the technique described herein.

In decoding the transcoded data block, the program codes further comprising instructions for deteiinining the prediction block y to be available and instructions for decoding the transcoded data block in accordance with the first decoding scheme which is preferably a lossless reconstruction technique. More particularly, according to the first decoding scheme, the decoder first obtains the prediction block y associated with the block of video data x from previous reconstructed video data, then transforms the prediction block y to obtain Y, quantizing the transformed prediction block Y to obtain Q(Y), subtracting the quantized transformed prediction block Q(Y) from the transcoded data block (i.e., Q(E)+Q(Y)) to recover the quantized transformed residual block (i.e., quantized coefficient block) Q(E), de-quantizing the subtracted transcoded data block to recover the coefficient block E, reconstructing the residual block e by inverse transforming the coefficient block E (i.e., re-scaled subtracted transcoded data block), and forming an approximation of the block of video data x̂ by summing the prediction block y and the reconstructed residual block ê. The reconstructed video data block x̂ obtain as such is a lossless reconstruction of the original video data block x.

If the decoder determines that the prediction block y is not available, the decoder program codes further include instructions for decoding the transcoded data block in accordance with the second decoding scheme, which is a lossy decoding technique, preferably. In according to the lossy decoding technique, the decoder first re-scales (i.e., de-quantizes) the transcoded data block Q(E)+Q(Y) to obtain the summation Y+Ê, and forms an approximation of the block of video data x̂ by inverse transforming $T^{-1}$ the re-scaled transcoded data block to obtain the summary y+ê, which is a lossy reconstruction of the original video data block.

In keeping with various embodiments described above, the video client program codes include instructions for receiving an incoming bit stream over a communications channel, instructions for extracting the coded video data from the bit stream and obtaining a coded video data block, instructions for determining whether the coded data block is a conventional coded data block or a transcoded data block based on the binary value associated with the data block. If the coded data block is coded by a video coding technique that complies with a video coding standard, the video client further decodes the data block using a decoding technique suitable for decoding the coded data block. If the coded data block is transcoded, the video client decodes the data block using the technique described herein.

In addition, the video client monitors the error parameter associated with the transmission channel such as the packet loss rate and reports the packet loss rate to the video server for adjusting the ratio of the transcoded data block in the video stream. The video client further reconstruct the original video stream based on the decoded data and display the video stream on a video display unit for viewing by a user.

The aforementioned software programs may be implemented using standard programming languages such as C/C++, C#, Java, and Basic. Alternatively, they may be implemented in commercial computing platforms such as MAT-LAB. The software programs may each be a standalone program executable by device 710 independent from other programs running on device 710, or it may each be a program embedded in other programs or operating system for providing video streaming and compression. For example, the encoder and server programs may be embedded into the UNIX operating system or the Windows Server system for providing digital video streaming services. The decoder and client program may be embedded into the Apple's QuickTime video program or the Microsoft's Windows Media Player program for receiving and decoding the video stream. The software programs for implementing the encoder, server, decoder, and client may reside on non-removable memory 741, or removable storage devices such as floppy disk 752 or CD/DVD 756. Upon starting the system 700 or receiving a user input through mouse 761 or keyboard 762 for executing the software programs, the program codes may be loaded into memory space 735 associated with application programs in system memory 730.

On the other hand, the video data to be encoded and decoded may be received bye device 710 through various devices. For example, the video data may be stored in non-removable memory 741 and loaded into memory space 737 associated with the program data in system memory 730. Alternatively, the video data to be encoded and decoded may be stored on floppy disk 752 or CD/DVD 756 and read into memory space 737 through memory interface 750 and disks reader 751 or 755. Still alternatively, the video data to be encoded and decoded may be input through network interface 770 from remote computer 780.

When a further instruction is received for executing the encoding or decoding program, the program codes including the instructions are read from memory space 735 and interpreted by processing unit 720. The program codes may instruct processing unit 720 to load the data that is previously received and stored in memory space 737 and processing the data according to the method described herein. During the process of the encoding or decoding, intermediate data and parameters including the reconstructed video frame, the prediction block y, the quantization results, the transform results may be stored in memory space 737 associated with the program data or in the internal registers of processing unit 720. When the encoding or decoding is completed, the resulting data may be stored in memory space 737 for subsequent processing or utilized by other programs. Alternatively, the resulting data may be output to non-removable memory 741 or the removable memory including floppy disks 752 and CD/DVD 756 for storage. It may be also transmitted to remote computer 780 through network interface 770 over LAN 771 or through modem 772 over WAN 773. Still alternatively, the resulting encoded or decoded data may be displayed on display device 791. It may be embedded in other video or non-video data so that the video data is displayed as embedded video along with other non-video content.

According to some other embodiments, the encoding and decoding methods and systems described herein may also be implemented on proprietary software/hardware system in the form computer cards inserted into a general purpose computer system. Alternatively, they may be implemented in the form of field-programmable gate array (FPGA) or the application-specific integrated circuit (ASIC).

In addition, in implementing the encoder, decoder, video server, and video client described above, the transform, quantization, encoding, their inverse operations including inverse transform, de-quantization, and decoding, and the motion compensation for generating prediction block preferably comply with a video coding standards such as H.261, H.262, H.263, H.264/AVC, MPEG-2, MPEG-4, AVS-M, AVS1.0, H.264/SVC, as well as other standards that are suitable for encoding video data.

EXPERIMENTS

The following experiments are presented herein to merely illustrate the effectiveness of one embodiment of the encoding and decoding techniques described above and are not intended to limit the scope of the invention.

In the experiments, all the video data have been previously encoded by H.264 (JM 13.2, baseline profile) and are to be transmitted over a packet erasure channel. The group of picture (GOP) structure is 'IPPP...' Three different methods are compared: the first is to send the encoded video stream directly, the second is to re-encode the video by H.264 with intra refresh (i.e. forcing some blocks to be I-blocks), and the third method is to transcode the video using the LIFT transcoder described above. The results of the comparison are presented below.

Rate-Distortion (RD) Performance

In Rate-Distortion (RD) performance test, each video is encoded at four different bitrate and the four compressed video streams for each video are transcoded. For the LIFT transcoder, 10% of P-blocks are transcoded into LP-blocks according to the LIFT transcoding technique. As benchmark comparison, the video stream is also re-coded based on H.264 with 10% intra refresh. The locations of the LP-blocks in the transcoded video frame are exactly the same as the I-blocks newly emerged in the recompression scheme generated by the H.264 technique.

As shown in FIGS. 11A-C, the LIFT transcoder has higher Rate-Distortion performance than the H.264 based transcoder, since the LIFT transcoder is a lossless transcoder. Compared with the original H.264 video stream, although the LIFT transcoded stream has a higher bitrate, it has the same Peak Signal-To-Noise Ratio (PSNR).

FIGS. 11A-C depicts another RD curve (i.e., the dash line) for reference, which is obtained by compressing the original uncompressed video with 10% intra refresh. The figure shows that the LIFT method can achieve similar RD performance with the 10% intra refresh compressed video.

Error Resilience Performance

FIGS. 12A and B depicts the error resilience performance of the LIFT transcoder and the H.264 transcoder at different packet loss rate 0%, 3%, 5%, 10%, 20%. For each loss rate, 100 different random loss patterns are simulated. The LIFT transcoder performs similarly to the H.264 transcoder at high loss rate, but gains 0.6 dB at loss rate 3% and 1.8 dB in error free case. Again the LIFT curve approaches the dash line which indicates H.264 compressed video with 10% intra refresh, assuming the original uncompressed video is available.

three time slots. Comparing the results in Table 1 shows that the LIFT coding technique saves bitrate at the first time slot corresponding to low packet loss rate without increasing the distortion and puts more bits into the third time slot corresponding to high packet loss rate, thereby reducing the distortion significantly. During the entire transmission, the LIFT coding technique gains more than 1.1 dB in average than H.264 recompression at the same bitrate.

TABLE 1

Adaptive error resilience test (foreman qcif at 15 Hz)

Test 1

| | T1: (p = 0%) | | T2: (p = 10%) | | T3: (p = 20%) | | overall ($\bar{p}$ = 10%) | |
|---|---|---|---|---|---|---|---|---|
| | bitrate | PSNR | bitrate | PSNR | bitrate | PSNR | bitrate (kb/s) | PSNR (dB) |
| original H.264 stream (to be transmitted) | 29.84 | 30.25 | 29.85 | 20.16 | 29.84 | 17.88 | 29.84 | 22.76 |
| offline recompression (add 10% intra) | 50.02 | 28.64 | 50.02 | 25.26 | 50.02 | 23.11 | 50.02 | 25.67 |
| proposed adaptive scheme | 29.84 | 30.25 | 49.82 | 25.36 | 69.41 | 24.77 | 46.69 | 26.79 |
| H.264 stream at 50 kb/s (for comparison only) | 50.43 | 32.93 | 50.43 | 20.60 | 50.43 | 18.07 | 50.43 | 23.87 |

Test 2

| | T1: (p = 0%) | | T2: (p = 5%) | | T3: (p = 10%) | | overall ($\bar{p}$ = 5%) | |
|---|---|---|---|---|---|---|---|---|
| | bitrate | PSNR | bitrate | PSNR | bitrate | PSNR | bitrate (kb/s) | PSNR (dB) |
| original H.264 stream (to be transmitted) | 29.84 | 30.25 | 29.84 | 23.38 | 29.84 | 20.15 | 29.84 | 24.60 |
| offline recompression (add 5% intra) | 40.04 | 28.74 | 40.04 | 26.02 | 40.04 | 23.70 | 40.04 | 26.15 |
| proposed adaptive scheme | 29.84 | 30.25 | 40.11 | 26.36 | 49.82 | 25.36 | 39.92 | 27.32 |
| H.264 stream at 40 kb/s (for comparison only) | 40.90 | 31.94 | 40.90 | 24.13 | 40.90 | 20.50 | 40.90 | 25.52 |

Adaptive Error Resilience

Two additional tests are conducted on transmitting compressed video over a time-varying channel. In the first test, the average packet loss rate $\bar{p}$ is 10% but the instant p changes during the transmission. The instant loss rate p is 0% at the beginning, but changes to 10% after ⅓ transmission time and becomes 20% at the last ⅓ transmission time. In the second test, the instant loss rate p is set at 0%, 5% and 10% respectively in the three time slots and the average loss rate $\bar{p}$ is 5%. In each time slot, the video sequence is transmitted 100 times to obtain the average performance. In conducting the tests, the server is assumed not able to afford online transcoding (e.g. due to the amount of clients), and thus all the transcoding (if required) are performed offline.

The simulation results are shown in Table 1. The LIFT video server performs offline transcoding and online composing as described above. Since the ratio of transcoded blocks is equal to the packet loss rate p at each time slot, accordingly, there are no transcoded blocks in the first time slot and more transcoded blocks in the third time slot. However, the H.264 recompression scheme can only transcode the video offline with fixed intra refresh rate (10% in the first test and 5% in the second test), due to the restriction of complexity. Therefore, the H.264 recompression scheme has fixed bitrate during the Although some exemplary embodiments of the invented injection-enhanced injection-locked frequency divider are disclosed here, it is not intended to unnecessarily limit the scope of the invention. Thus, simple modifications or variations without departing from the principle or the extent of the claims are still within the scope of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for transmitting digital video data having a plurality of data blocks, the method including:
    encoding a video data block to a coded data block, wherein the encoding comprises: forming a prediction block associated with the video data block;
    calculating a residual block by subtracting the prediction block from the video data block; transforming the residual block;
    quantizing the transformed residual block; and
    forming the coded data block by encoding the quantized transformed residual block utilizing entropy coding;
    converting the coded data block to a transcoded data block incorporating the prediction block and the residual block associated with the video data block, wherein the converting comprises:
    decoding the coded data block into the quantized transformed residual block;
    forming the prediction block corresponding to the video data block; transforming and quantizing the prediction block;
    summing the quantized transformed residual and the quantized transformed prediction blocks; and
    generating the transcoded data block by encoding the summation; and
    transmitting the transcoded data block as part of an encoded bitstream to a decoder for decoding; and
    adjusting a ratio of the transcoded data blocks and the coded data blocks in the bitstream.

2. The method of claim 1 wherein the video data block, the coded data block, the transcoded data block, the prediction block, and the residual block have a same size and the size is N×N, where N is an integer.

3. The method of claim 1, wherein the digital video data include a sequence of frames and each frame has one or more data blocks.

4. The method of claim 3, wherein the coded data block is a intra-coded data block and the prediction block associated with the video data block is formed based on data from a frame including the video data block.

5. The method of claim 3, wherein the coded data block is a inter-coded data block and the prediction block associated with the video data block is formed based on data from a frame not including the video data block.

6. The method of claim 1, wherein each of the transform, quantization, and coding operations has an inverse operation that complies with a video coding standard.

7. The method of claim 6, wherein the video coding standard is one of H.261, H.262, H.263, H.264/AVC, MPEG-2, MPEG-4, AVS-M, AVS1.0, H.264/SVC.

8. The method of claim 1, wherein the transform, quantization, and encoding comply with a video coding standard selected from a group of H.261, H.262, H.263, H.264/AVC, MPEG-2, MPEG-4, AVS-M, AVS1.0, H.264/SVC.

9. The method of claim 1, wherein the digital video data include a sequence of frames, the method further comprising:
    forming an approximation of the residual block;
    reconstructing the video data block by summing the approximation of the residual block and the prediction block; and
    incorporating the reconstructed video data block into a reconstruction of the sequence of frames.

10. The method of claim 9, further comprising applying a motion compensation to the reconstruction of the sequence of the frames, wherein the prediction block is obtained from the motion compensated frames.

11. The method of claim 10, wherein the coded data block is an intra-coded data block and the predication block is obtained from a motion compensated frame including the reconstructed video data block.

12. The method of claim 10, wherein the coded data block is an inter-coded data block and the predication block is obtained from a motion compensated frame not including the reconstructed video data block.

13. A non-transitory computer readable medium including program codes for instructing one or more digital processors for transmitting digital video data having a plurality of data blocks, the program codes including instructions for:
    encoding a video data block to a coded data block, wherein the encoding comprises: forming a prediction block associated with the video data block;
    calculating a residual block by subtracting the prediction block from the video data block; transforming the residual block;
    quantizing the transformed residual block; and
    forming the coded data block by encoding the quantized transformed residual block utilizing entropy coding;
    converting the coded data block to a transcoded data block incorporating the prediction block and the residual block associated with the video data block, wherein the converting comprises:
    decoding the coded data block into the quantized transformed residual block;
    forming the prediction block corresponding to the video data block; transforming and quantizing the prediction block;
    summing the quantized transformed residual and the quantized transformed prediction blocks; and
    generating the transcoded data block by encoding the summation; and
    transmitting the transcoded data block as part of an encoded bitstream to a decoder for decoding; and
    adjusting a ratio of the transcoded data blocks and the coded data blocks in the bitstream.

14. The method of claim 13, wherein the digital video data include a sequence of frames, the computer codes further comprising instructions for:
    forming an approximation of the residual block from the quantized transformed residual block;

summing the approximation of the residual block and the prediction block and generating a reconstruction of video data block; and incorporating the reconstruction of the video data block into a reconstruction of the sequence of frames.

15. A method for providing a video service based on digital video data having a plurality of data blocks, the method including:

encoding each of the plurality of data blocks to a coded data block, wherein the encoding for each respective data block comprises:

forming a prediction block associated with the video data block;

calculating a residual block by subtracting the prediction block from the video data block;

transforming the residual block;

quantizing the transformed residual block; and forming the coded data block by encoding the quantized transformed residual block utilizing entropy coding;

converting each of the plurality of coded data blocks to a transcoded data block incorporating the prediction block and the residual block associated with the respective video data block, wherein the converting comprises:

decoding the coded data block into the quantized transformed residual block;

forming the prediction block corresponding to the video data block;

transforming and quantizing the prediction block;

summing the quantized transformed residual and the quantized transformed prediction blocks; and generating the transcoded data block by encoding the summation;

transmitting at least one of the plurality of coded data blocks and at least one of the plurality of transcoded data blocks in a bitstream transmitted over a computer network to a decoder; and adjusting a ratio of the transcoded data blocks and the coded data blocks in the bitstream.

16. The method of claim 15, further comprising:

receiving from the decoder an error parameter associated with the transmission over the computer network; and adjusting in response to the error parameter the ratio of the transcoded data blocks and the coded data blocks.

17. The method of claim 16, wherein the computer network is a packet based network and the radio parameter includes a packet loss rate.

18. The method of claim 17, further comprising:

detecting an upward trend of the packet loss rate; and increasing the ratio of the transcoded data blocks and the coded data blocks in response to the upward trend of the packet loss rate.

19. The method of claim 17, further comprising:

detecting a downward trend of the packet loss rate; and decreasing the ratio of the transcoded data blocks and the coded data blocks in response to the downward trend of the packet loss rate.

20. The method of claim 17, further comprising:

determining the packet loss rate higher than a preset threshold value; and increasing the ratio of the transcoded data blocks and the coded data blocks in response to the determination result.

21. The method of claim 17, further comprising:

determining the packet loss rate lower than a preset threshold value; and decreasing the ratio of the transcoded data blocks and the coded data blocks in response to the determination result.

22. The method of claim 15, transmitting at least one of the plurality of coded data blocks and at least one of the plurality of transcoded data blocks in the bitstream further comprising:

forming composite video data by replacing one or more of the plurality of coded data blocks with the corresponding one or more transcoded data blocks;

generating a binary map, wherein each bit of the binary map corresponds to a block of the composite video data and the each bit of the binary map has a value indicating the corresponding block is one of the coded data blocks or one of the transcoded data blocks; and incorporating the binary map into the bitstream for transmission to the decoder.

23. A non-transitory computer readable medium having program codes stored thereon, the program codes being executable by one of more digital processor for providing a video service based on digital video data having a plurality of data blocks, the computer codes including instructions for:

encoding each of the plurality of data blocks to a coded data block, wherein the encoding for each respective data block comprises:

forming a prediction block associated with the video data block;

calculating a residual block by subtracting the prediction block from the video data block;

transforming the residual block;

quantizing the transformed residual block; and forming the coded data block by encoding the quantized transformed residual block utilizing entropy coding;

converting each of the plurality of coded data blocks to a transcoded data block incorporating the prediction block and the residual block associated with the respective video data block, wherein the converting comprises:

decoding the coded data block into the quantized transformed residual block;

forming the prediction block corresponding to the video data block;

transforming and quantizing the prediction block;

summing the quantized transformed residual and the quantized transformed prediction blocks; and generating the transcoded data block by encoding the summation;

transmitting at least one of the plurality of coded data blocks and at least one of the plurality of transcoded data blocks in a bitstream transmitted over a computer network to a decoder; and adjusting a ratio of the transcoded data blocks in the bitstream.

24. The computer readable medium of claim 23, the program codes further comprising instructions for:

receiving from the decoder an error parameter associated with the transmission over the computer network; and adjusting in response to the error parameter the ratio of the transcoded data blocks in the bitstream.

25. The computer readable medium of claim 24, wherein the error parameter is indicative of a transmission quality of the transmission over the computer network.

26. The computer readable medium of claim 24, the instructions for transmitting at least one of the plurality of coded data blocks and at least one of the plurality of transcoded data blocks in the bitstream further comprising instructions for:
- forming composite video data by replacing one or more of the plurality of coded data blocks with the corresponding one or more transcoded data blocks;
- generating a binary map, wherein each bit of the binary map corresponds to a block of the composite video data and the each bit of the binary map has a value indicating that the corresponding block is one of the coded data blocks or one of the transcoded data blocks; and
- incorporating the binary map into the bitstream for transmission to the decoder.

\* \* \* \* \*